(12) United States Patent
Yamaguchi et al.

(10) Patent No.: US 8,300,919 B2
(45) Date of Patent: Oct. 30, 2012

(54) APPARATUS FOR DATA ANALYSIS

(75) Inventors: Atsuko Yamaguchi, Kodaira (JP); Hiroki Kawada, Tsuchiura (JP)

(73) Assignee: Hitachi High-Technologies Corporation, Tokyo (JP)

( * ) Notice: Subject to any disclaimer, the term of this patent is extended or adjusted under 35 U.S.C. 154(b) by 803 days.

(21) Appl. No.: 12/413,631

(22) Filed: Mar. 30, 2009

(65) Prior Publication Data

US 2009/0263024 A1   Oct. 22, 2009

(30) Foreign Application Priority Data

Apr. 17, 2008  (JP) ................................. 2008-107536

(51) Int. Cl.
*G06K 9/00* (2006.01)
(52) U.S. Cl. .................... 382/141; 382/199; 356/237.2; 250/559.36; 348/128
(58) Field of Classification Search .................. 382/141, 382/199; 356/237.2; 250/559.36; 348/128
See application file for complete search history.

(56) References Cited

U.S. PATENT DOCUMENTS

| | | | |
|---|---|---|---|
| 5,805,728 A * | 9/1998 | Munesada et al. | 382/199 |
| 6,516,528 B1 * | 2/2003 | Choo et al. | 33/552 |
| 6,909,791 B2 * | 6/2005 | Nikitin et al. | 382/108 |
| 7,184,152 B2 * | 2/2007 | Brill | 356/636 |
| 7,405,835 B2 * | 7/2008 | Yamaguchi et al. | 356/605 |
| 2005/0275850 A1 * | 12/2005 | Bischoff et al. | 356/600 |

FOREIGN PATENT DOCUMENTS

| | | |
|---|---|---|
| JP | 2003-302214 A | 10/2003 |
| JP | 2006-510912 A | 3/2006 |

OTHER PUBLICATIONS

Nelson et al., Comparison of metrology methods for quantifying the line edge roughness of patterned features, J. Vac. Sci. Technol. B, vol. 17, No. 6 pp. 2488-2498, Nov./Dec. 1999.

* cited by examiner

*Primary Examiner* — John Strege
(74) *Attorney, Agent, or Firm* — Mattingly & Malur, PC

(57) ABSTRACT

Edge points are extracted by specifying a height (values indicating a distance from a substrate) on a pattern when edges of the pattern are extracted from a CD-SEM image. Further, LER values obtained by the extraction of a Fourier spectrum of the LER are obtained. When the same sample is previously observed with the AFM and the CD-SEM, a size of the LER obtained by specifying a height, an auto-correlation distance of the LER, or an index called the spectrum is obtained from results of the AFM observation. Further, theses indices obtained by specifying image processing conditions for detecting the edge points from the CD-SEM observation result are obtained. Also, it is determined that heights providing values when the values are matched correspond to the image processing conditions and then, the edge points are extracted from the CD-SEM IMAGE instead of the AFM observation by using the image processing conditions.

12 Claims, 18 Drawing Sheets

APPARATUS FOR DATA ANALYSIS

CLAIM OF PRIORITY

The present application claims priority from Japanese patent application JP 2008-107536 filed on Apr. 17, 2008, the content of which is hereby incorporated by reference into this application.

BACKGROUND OF THE INVENTION

1. Field of the Invention

The present invention relates to a method for evaluating a pattern dimension, a method for evaluating roughness of a pattern edge, or a method for evaluating fluctuation of a local size of a pattern, by performing a nondestructive observation and an image processing using a scanning microscope and an atomic force microscope and an apparatus for data analysis that can realize these methods.

2. Description of the Related Art

In the semiconductor industry and other industries, a need to accurately define a pattern shape (hereinafter, referred to as a pattern shape index) has been raised with the fineness of a pattern processing dimension. As the index indicating the pattern shape (hereinafter, referred to as a pattern shape index), there may be a degree of fine roughness of a pattern edge that is randomly generated, the roughness being referred to as edge roughness, a local dimension caused due to the above-mentioned roughness, sharpness of a roughness shape, etc., in addition to the pattern dimension.

However, the above-mentioned degrees are particularly important to a gate of a transistor or an interconnect pattern that requires fineness. The deviations from a design shape of the pattern shape occur in the gate pattern of the transistor, such that the performance of the transistor is deteriorated or distributed. Further, the deviations in the interconnect pattern reduce the lifespan of the devices.

In most cases, since these patterns are line patterns, the above-mentioned pattern shape index may be considered to be the finest line pattern dimension (in general, critical dimension called CD) that is created in a manufacturing process, a degree of line-edge roughness (LER), a degree of line-width roughness (LWR), or a spatial frequency of LER, LWR, hall edge roughness, etc. The definition of the pattern shape index (calculation sequence) will be described in detail below. Even if these amounts can also be defined on the hall pattern, it is assumed to be the line pattern for clarity.

First, a process that takes out a pattern edge with a two-dimensional shape from a pattern with a three-dimensional shape will be described. These indices are obtained as follows. As shown in FIG. 1, a plane on which a base of a pattern is provided is assumed to be an xy plane. Further, a direction along a line is assumed to be a y direction, a vertical direction is assumed to be an x direction, and a direction vertical to the xy plane is assumed to be a z direction. If the pattern is cut on the plane that is z=H, as shown in FIG. 2, an area 204 becomes a field of view. Each of the line edges 201 and 202 is a left edge and a right edge. Various kinds of indices indicating characteristics of the pattern shape are obtained from a curve indicating the position of the edge points.

Although a true pattern edge is a set of continuous points as shown in FIG. 2, in order to practically evaluate the shape, these should be transformed into discrete data. The process will be described. First, an inspection area is determined. The pattern edge is determined within the range. Since the inspection area may be equal to a field of view, it is assumed that the inspection area herein is equal to the field of view.

The pattern edges existing in the inspection area are represented by n points. In other words, a sampling interval is defined as $\Delta y$ and a straight line is represented by the following Equation 1.

$$y = i \cdot \Delta y \ (i=1, 2, \ldots n) \quad \text{[Equation 1]}$$

This straight line assumes that a point intersecting with a line edge 201 or 202 is an edge point $x_{Li}$ or $x_{Ri}$. Subscripts L and R represent a left edge and a right edge, respectively. Various kinds of indices indicating the characteristics of the patterns can be defined from a set of these discrete points. When LER(3σ), spectrum, etc., are obtained, there is a need to calculate an approximation straight line of 201 or 202. To this end, a straight line best describing this is obtained using a set of points $\{(x_{ji}, i\Delta y) | i=1, 2, \ldots n\}$ (j=R or L). A well known method is a least square method. Next, a difference between the edge point $x_{Li}$ or the edge point $x_{Ri}$ and an x coordinate of an approximation straight line is calculated on each straight line represented by Equation 1. The difference (hereinafter, it is marked by a deviation amount of the position of the edge points) of the x coordinate obtained from the line edge 201 is assumed to be $\Delta x_{Li}$ and the deviation amount of the position of the edge points obtained from the line edge 202 is assumed to be $\Delta x_{Ri}$ (i=1, 2, … n). The degree of LER is mainly represented as three times as large as a standard deviation of a distribution of $\Delta x_{Li}$ or $\Delta x_{Ri}$. Further, the degree of LWR is mainly represented as three times as large as a standard deviation of a distribution of a local line width $w_i$ represented as follows.

$$w_i = x_{Ri} - x_{Li} \quad \text{[Equation 2]}$$

Hereinafter, these indices are described as the LER(3σ) and the LWR(3σ). Further, as amounts indicating the characteristics of the LER (or LWR) shape, there are skewness (hereinafter, represented by γ) of the LER (or LWR) distribution, a correlation length (hereinafter, represented by ξ) of the LER (or LWR), etc. γ is skewness (third order moment) of a histogram of $\Delta x_{Li}$, $\Delta x_{Ri}$ or, $w_i$. Further, ξ is provided by the following Equation 3 for p values that are determined by a user.

$$p = \int \Delta x(y) \Delta x(y-\xi) dy \quad \text{[Equation 3]}$$

As the p values, values such as 1/e, 0.2, 0 are mainly used. Further, in the above Equation 3, $\Delta x_{Ri}$ or $\Delta x_{Li}$ is represented by $\Delta x$. y has a relationship with i as in Equation 1. In the actual calculation, it is obtained as a sum of discrete amounts rather than an integration of a continuous function.

Moreover, the height of the pattern is constantly approximated in any cross sections and one that divides H by the height of the pattern (for example, a maximum value of actually measured values, etc.) is represented by h. Hereinafter; values representing a distance from a substrate of a plane are represented by h, which will be described below.

Further, the method for determining the above-mentioned edge is ideal, but a method or a sequence that transforms a true three-dimensional shape into a two-dimensional shape (edge), a set of continuous points into a set of discrete points may be any of various methods or sequences. In addition, the noise reduction of the image is performed by performing various kinds of image processes on data before extracting the position of the edges.

In general, the above-mentioned indices can be evaluated using a scanning electron microscope having a length measuring function. This tool is called a critical dimension scanning electron microscope (CD-SEM). However, an image obtained through observation with the CD-SEM is a sky observation image. To be exact, ξ or γ of CD, LER(3σ), LWR(3σ), LER or LWR is a function of h, but it is difficult to obtain the index values when h is directly specified from the CD-SEM observation image. However, even when it is assumed that the pattern is considered to be the ideal line and the pattern shape is hardly changed in a height (z) direction, there is no problem.

When the pattern dimension becomes small, the three-dimensional structure of the created pattern has a great effect on the performance of the device. Therefore, when the position along the height direction of the pattern, that is, h is specified in the semiconductor inspection, there is a need to obtain the foregoing index values. Hereinafter, these amounts are represented by the functions of CD(h), 3σ(h), ξ(h), γ(h), and h.

As described above, in a semiconductor mass-production process, the CD-SEM has been used as a tool for inspection and metrology. Meanwhile, as a tool for measuring a fine structure, an atomic force microscope (AFM) has been known well. Further, as the tool for measuring a fine structure, in addition to the AFM, a scanning probe microscope (SPM) such as a scanning tunneling microscope (STM) has been known. However, in the present specification, the AFM will be described as one example of the SPM.

The advantages and disadvantages of each of the CD-SEM and AFM will be described below.

First, the CD-SEM has a high throughput. Further, it has an incident beam diameter smaller than 2 nm. In other words, it has very high resolution. A measurable line length (maximum value) is several microns, which is also sufficient to measure CD values, LER(3σ), or LWR(3σ). Meanwhile, there is a disadvantage in that it is impossible to directly measure the three-dimensional shape. Essentially, if a set of points (x, y, and z), which form the pattern surface within the three-dimensional space is provided, it is in principle possible to create the CD-SEM images by estimating and simulating electron beams incident thereon. However, the simulation itself is very difficult and inverse transform is much more difficult. In other words, the three-dimensional information is included in the CD-SEM images, but it is difficult to take out the three-dimensional information.

On the other hand, the AFM can directly measure the three-dimensional shape. The resolution depends on a radius of curvature of a tip of a probe used, but recently the probe has been created to have a size of 2 nm. In other words, there is sufficient resolution. However, the throughput decreases and there is drift of the signal, such that the line length can only be accurately measured to about 200 nm. Further, the line length that can be measured is a trade-off in respects to accuracy.

As described above, the AFM has suitably been used recently to evaluate the required three-dimensional shape. As described above, it is difficult to directly transform the three-dimensional shape data such as in the AFM by transforming the CD-SEM images. However, for the inspection in the semiconductor mass-production process that is necessary to observe the long line and requires high throughput, there are no solutions other than the method of using the CD-SEM.

An evaluation and optimization method for these measurement tools such as CD-SEM and AFM is disclosed in JP-T-2006-510912 and a comparative example of the LERs of the CD-SEM and the AFM is described in "C. Nelson, et al., Journal of Vacuum Science Technology, B17, pp. 2488-2498 (1999)".

SUMMARY OF THE INVENTION

In order to solve the above problems, it suffices to calculate critical index values when H or h is specified, rather than to provide complete three-dimensional shape data (a set of points indicating a pattern surface). For example, even if complete three-dimensional shape data is obtained, a mass-production process requiring high-speed inspection determines whether or not the shape is good by only using the simple indices that represent the three-dimensional shape. In other words, even if the values such as 3σ(h) are obtained in a short time or cannot be obtained, it is preferable to obtain a relationship between h and edge-detection conditions of a CD-SEM.

For example, the CD values of a true pattern shape or h dependency on an edge position is obtained and measurement conditions when the CD values are obtained from the CD-SEM image, that is, image processing conditions for detecting the edge points (hereinafter, these conditions are represented by P (large P)) variously change, thereby calculating the CD values. Comparing the results, the relationship between h and P can be defined. Once the relationship between h and P is determined, P may be specified instead of specifying h on the pattern to perform the CD measurement (or LER(3σ) measurement, etc.) with high throughput on the long line.

As a method of obtaining P corresponding to h using the CD, the method disclosed in JP-T-2006-510912 has been considered. The method defines a measurement system that becomes a reference and a measurement system that performs evaluation. Herein, the term "system" includes a tool as well as measurement conditions. Next, a sampling having different CD values, which become a reference, is prepared. The CD values of the sampling are measured at both the measurement system that becomes a reference and the measurement system that performs evaluation. From these results, measurement uncertainty of the measurement system that performs evaluation is calculated by the method disclosed in JP-T-2006-510912. The calculation of the measurement uncertainty is performed in some measurement systems. Some measurement systems perform this measurement uncertainty, and in the measurement method, the system having the minimum measurement uncertainty corresponds to the measurement system that becomes a reference. For example, the measurement system that becomes a reference may be considered as the AFM, the height h may be considered as the specified and measured result, and the measurement system that performs evaluation may be considered as the CD-SEM that performs the measurement by the measurement condition P.

However, in the contexts described in JP-T-2006-510912, the indices used to obtain the relationship between h and P are indices obtained from the cross section shape such as a CD, a pattern height, and a sidewall angle of a cross section. For this reason, only a sampling having small variation in the cross section shape along the line can be applied. If the measurement places by the measurement system that becomes a reference completely match the measurement places by the measurement system that performs the evaluation, no problems occur. Actually, however, it is difficult to perform the measurement in the sample in which LER exists.

Further, even when the invention of JP-T-2006-510912 is applied to the LER measurement, it is difficult to perform accurate evaluation for the following two reasons. First, since the LER values themselves are largely different by places, it is difficult to perform accurate evaluation for the reason similar to the CD. Second, the method should prepare the plural samples (artifacts) having different LER values, but it is difficult to create the sample having largely different LERs (when the LER is large, in most cases, tailing, top-rounding, or variation thereof is also simultaneously large and it is impossible to select the pattern that becomes a reference upon measuring). In the method, the corresponding relationship between h and P is obtained using the measurement uncertainty. In essentials, however, the phenomenon that the shape is different by the place called the LER hinders the calculation of the measurement uncertainty, such that it is not suitable to use the LER for this method.

Moreover, in C. Nelson, et al., the LERs having the plural places are measured by both the AFM and the CD-SEM and then compared. As a result, in the place having a large LER measured with the AFM, it is confirmed that the result measured with the CD-SEM is also large. However, this article is not clear as to the corresponding relationship between h and P and it is assumed that h=P from the start. For this reason, even if the large and small relationship depending on the measurement place of the LER is matched, the LER values themselves are not matched to each other. Further, the comparison between the measurement values where h or P is changed is not performed. Moreover, in the data described in C. Nelson, et al., there is a problem in that the noise removing process is not considered. If a method of removing the effect of the noise from the LER(3σ) is not used, it is difficult to observe the pattern (in order to reduce damage, measurement is performed from an image having a large noise) that is easily subjected to damage upon observing the resist pattern, etc., with the CD-SEM.

As described above, there is a need to calculate the CD values or the LER values, etc., that specifies the height of the true pattern having high throughput as the LSI pattern becomes fine. However, this function cannot be realized by both the AFM and the CD-SEM. Presently, the approach of obtaining the measurement conditions for detecting the edge point having the specified height from the CD-SEM image by comparing the CD values (depending on a height) obtained from the cross section shape measured with the AFM and the CD values or the edge position (depending on the measurement parameter) obtained from the image of the CD-SEM is considered, but this approach cannot obtain reliable results.

It is a technical problem of the present invention to provide an apparatus for data analysis for SEM capable of accurately obtaining index values indicating characteristics of pattern shapes such as CD values, LER values, and LER spectrum in a short time when a height of a pattern is specified.

The above technical problem can be solved by comparing the CDs or the edge positions in the cross section of the related art as well as by comparing the edge shapes, that is, the information on the shape in a direction along a line. In detail, the index indicating the characteristic of the LER, the standard deviation $\sigma$, $3\sigma$, the correlation length $\xi$ of the LER, the skewness $\gamma$ of the edge position distribution of the LER, the spectrum of the LER, or the variation itself of the edge position that are roughness parameters indicating the roughness of the edge of the line pattern is used.

In other words, in order to resolve the technical problem, the present invention preferably provides an apparatus for data analysis having a processor and a display unit, the apparatus for data analysis including: a function that obtains roughness parameters indicating characteristics of roughness of a line pattern edge from cross section data cut in a plane parallel with a substrate based on results obtained by observing a line pattern on the substrate with a scanning probe microscope; a function that displays an X-Y graph using the values of the roughness parameters as one value or the distance from the substrate of the plane or values h obtained by dividing a distance from the substrate of the plane by a height of the pattern as the other value; a function that extracts the edges of the line pattern according to image processing conditions specified by an operator from the observation image of the line pattern from an upper surface of the substrate by a scanning electron microscope and obtains the roughness parameters indicating the characteristics of roughness of the edges; and a function that displays the X-Y graph using the values of the roughness parameters obtained from the observation image of the scanning electron microscope as one value and the values of the parameters indicating the image processing conditions as the other value.

Further, the present invention provides an apparatus for data analysis including: a function that extracts edge points of a pattern from cross section data cut in a plane parallel with a substrate and specifying a distance from the substrate or values h obtained by dividing the distance from the substrate by a height of the pattern based on results obtained by observing a line pattern on the substrate with a scanning probe microscope, defines x coordinates and y coordinates, respectively, in a direction vertical and parallel to the line, performs Fourier transform on $\Delta x(y)$ where a deviation from an average value or a design value of the x coordinates of the pattern edge points is represented as a function of y, and calculates and displays one indicating, as a function of a spatial frequency f, Fourier amplitude or a square of the Fourier amplitude obtained from the result of the Fourier transform, that is, Fourier amplitude spectrum or Fourier power spectrum of the roughness; and a function that extracts the edge points of the line pattern according to image processing conditions specified by an operator from the observation image of the line pattern from an upper surface of the substrate by a scanning electron microscope and calculates and displays the Fourier amplitude spectrum or the Fourier power spectrum of the roughness.

Moreover, the present invention provides an apparatus for data analysis including a function that extracts edge points of a pattern from cross section data cut in a plane parallel with a substrate and specifying a distance from the substrate or values h obtained by dividing the distance from the substrate by a height of the pattern based on results obtained by observing a line pattern on the substrate with a scanning probe microscope, defines x coordinates and y coordinates, respectively, in a direction vertical and parallel to the line, respectively, and obtains $\Delta x(y)$ where a deviation from an average value or a design value of the x coordinates of the pattern edge points is represented as a function of y; and a function that extracts the edge points of the line pattern according to image processing conditions specified by an operator from the observation image of the line pattern from an upper surface of the substrate by a scanning electron microscope and obtains $\Delta x'(y)$ where the deviation from the average value or the design value of the x coordinates of the pattern edge points is represented as the function of y; and a function that obtains a correlation coefficient c between $\Delta x(y)$ and $\Delta x'(y)$.

Preferably, when the x coordinates are defined in a direction vertical to the line of the line pattern as the above-mentioned roughness parameter, the value ($\sigma$ or $3\sigma$) indicating the standard deviation of the distribution of the x coordinates of the line pattern edge points is defined, or the skewness $\gamma$ of the distribution of the x coordinates of the line pattern edge points is defined, or the y coordinates vertical to the x coordinates is defined and an auto-correlation length $\xi$ of $\Delta x(y)$ where the deviation from the average value or the design value of the x coordinates of the line edge points is represented as the function of y, that is, the auto-correlation length of the roughness is used.

In addition, in the present specification, it is to be noted that the distance from a substrate of a plane of the pattern or the values h dividing the distance from the substrate of the plane by the height of the pattern may be called "values indicating a distance", the standard deviation σ and three times the standard deviation, that is, 3σ may collectively be called "values indicating standard deviation". Further, one indicating, as the function of the spatial frequency f, the Fourier amplitude or the square of the Fourier amplitude obtained from the Fourier transformed results, that is, the Fourier amplitude spectrum or the Fourier power spectrum may collectively be called "Fourier spectrum". Further, as described above, the atomic force microscope or a scanning tunnel microscope, etc., is collectively called "scanning probe microscope".

Moreover, ones based on the observation image of the scanning probe microscope and the scanning electron microscope among the roughness parameters indicating the characteristics of the roughness of the line pattern edges may be called a first roughness parameter and a second roughness parameter, respectively. This can also be applied to the Fourier spectrum.

In the method according to the related art, it was difficult to accurately obtain the CD values or the shape values in addition to the CD values when the height was specified. With the present invention, it is possible to obtain the LER spectrum or the LWR spectrum when the height is specified, or the degree of the LER or LWR and the index values relating to other shapes simply and in a short time. Further, since the image processing conditions that detect the edge points of the line pattern of the CD-SEM corresponding to the height of the pattern are calculated and then, the calculated image processing conditions can be used, if necessary, it is possible to improve the precision without decreasing the speed of the pattern inspection.

DETAILED DESCRIPTION OF THE PREFERRED EMBODIMENTS

Hereinafter, the best mode for carrying out the present invention will be described with reference to the accompanying drawings, but outlined contexts of the present invention will first be described with reference to the accompanying drawings.

Figure 1:
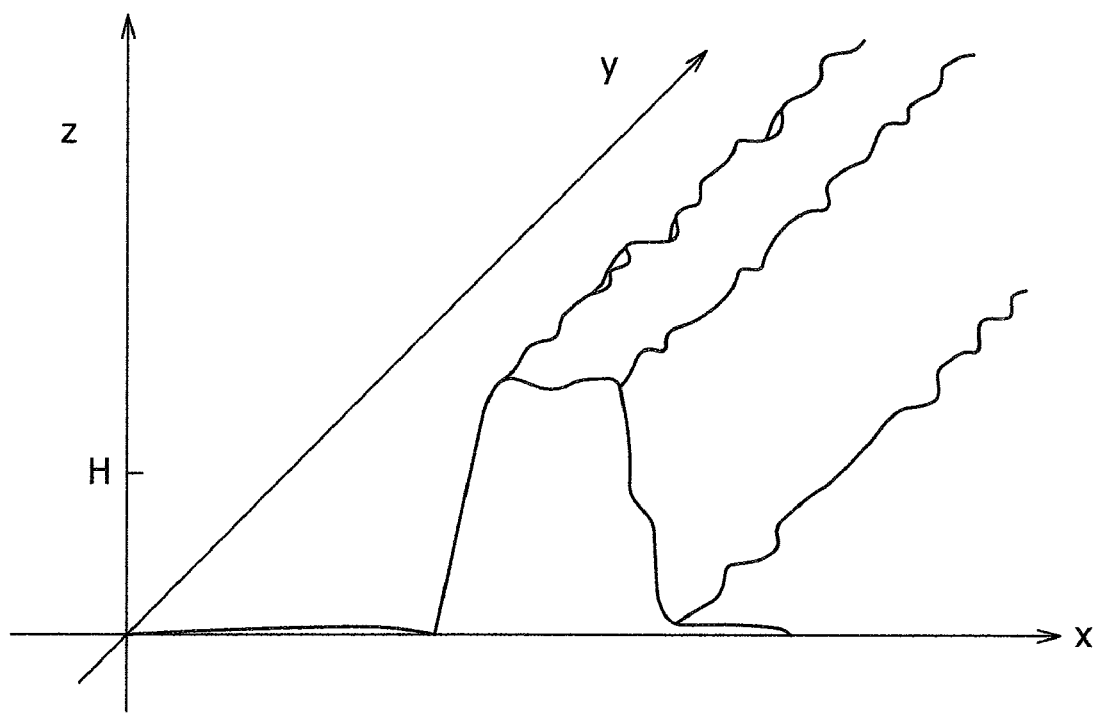
FIG. 1 is a diagram showing a three-dimensional image of an observation sample and defining x, y, and z axes.
Figure 2:
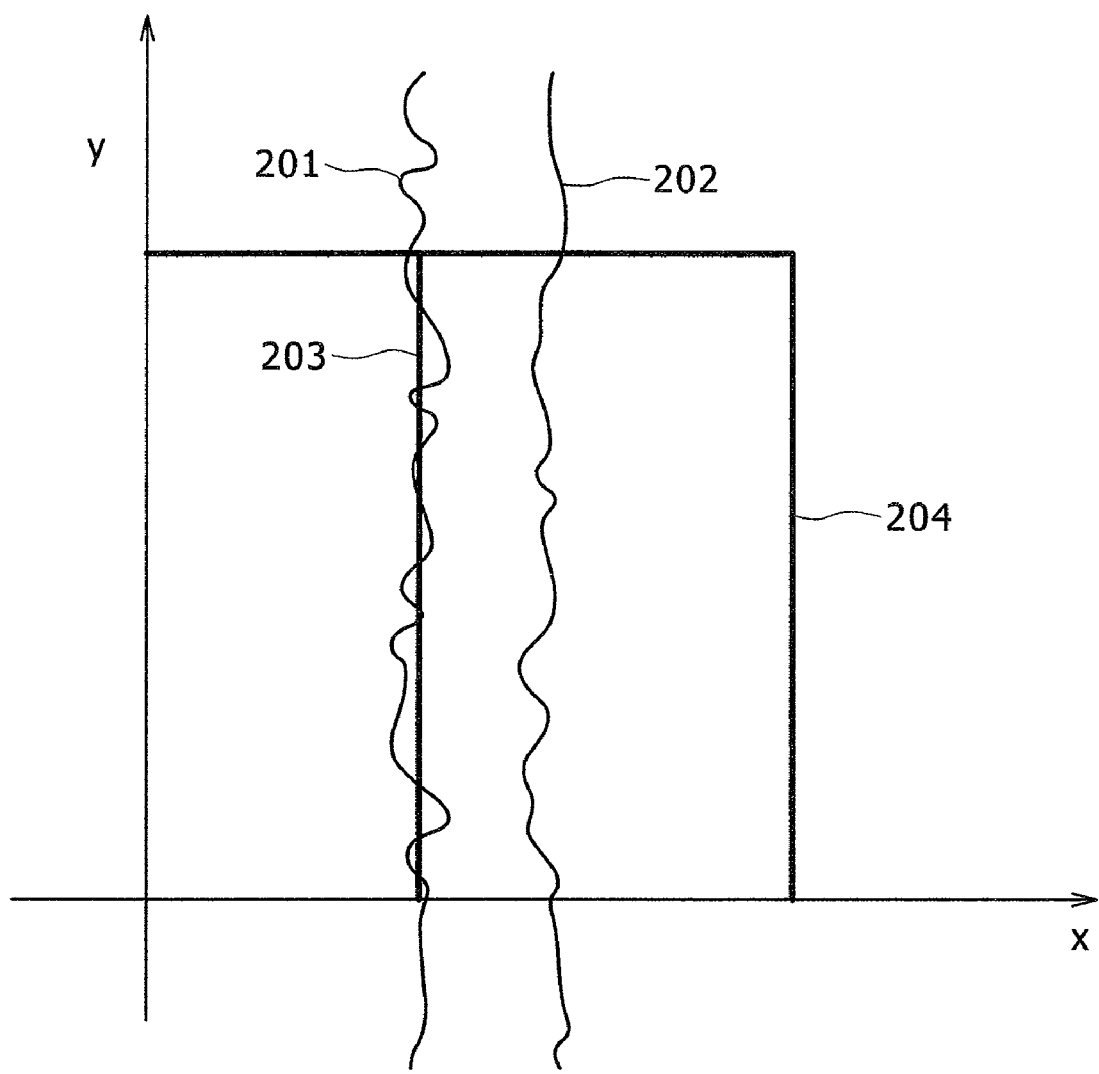
FIG. 2 is a cross-sectional view when an observation sample is cut in a plane parallel with a substrate used in a first embodiment.
Figure 3:
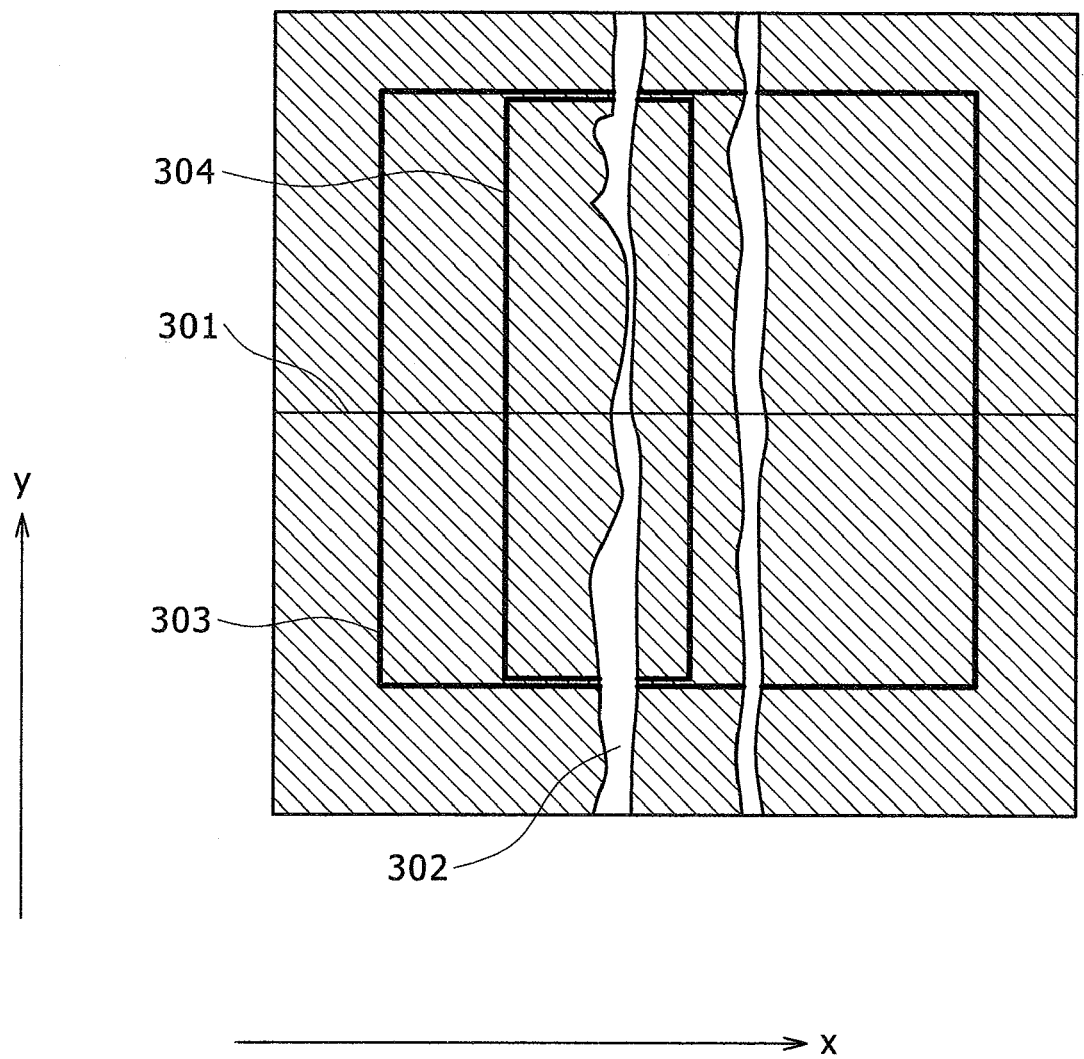
FIG. 3 is a diagram showing an example of observation images with a CD-SEM used in the first embodiment.
Figure 4A:
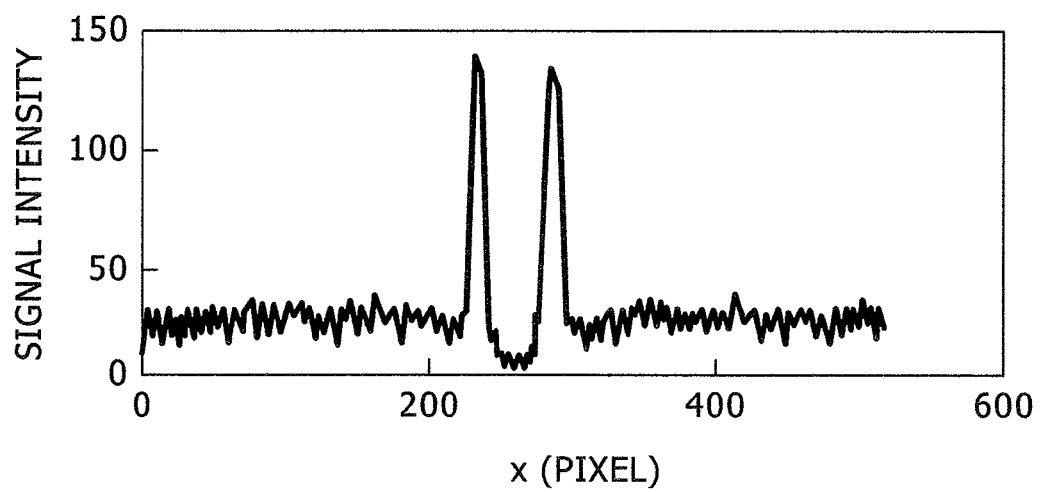
FIGS. 4A and 4B are conceptual diagrams for explaining a signal profile and a method defining edge points on the signal profile.
Figure 4B:
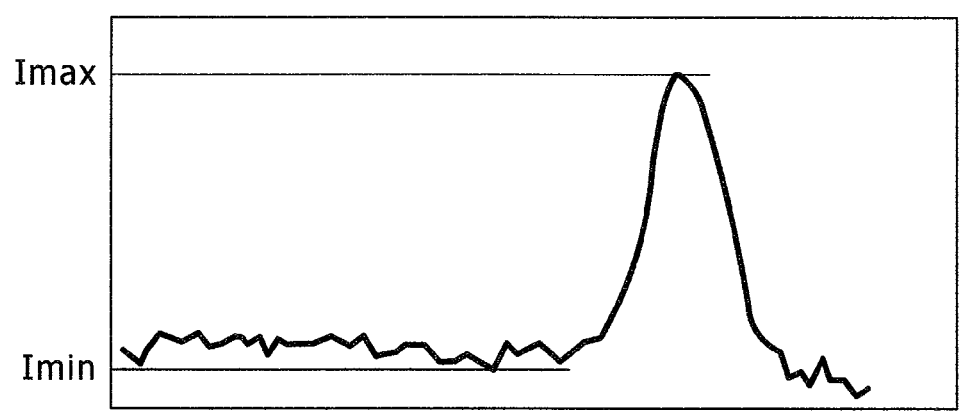

First, a general sequence that extracts positions of edge points of a line pattern from a CD-SEM image will be described. FIG. 2, which shows a true pattern shape, first defines a set of continuous points indicating line edges and in contrast, discrete edge points on a line where y coordinates satisfy Equation 1. Even in the CD-SEM image, xy axes are defined, similar to FIG. 2. However, instead of a line corresponding to a line edge 201 in the CD-SEM image, there is a band-shaped area having relatively high signal intensity of the SEM. FIG. 3 briefly shows this shape. In FIG. 3, an area (hatch portion) having low signal intensity and an area (white portion) having high signal intensity are divided, but in an actual image, the signal intensity is further divided into many steps (for example, 256 steps, from 0 to 255, etc.). In most cases, in order to reduce noise, image processing is performed. Thereafter, the signal from on a line where the y coordinates satisfy Equation 1, that is, x dependency on the signal intensity I is called a signal profile. FIG. 4A is a diagram showing a signal profile from on a straight line 301 of FIG. 3 and FIG. 4B is an enlarged diagram of a circumference of a peak corresponding to a left edge. A unit of a traverse axis is a pixel number of an image and a unit of a longitudinal axis is one that corrects signal intensity of secondary electron to values from 0 to 225.

For the signal profile, the edge points are defined by various methods. Hereinafter, a threshold method that is well known as the definition method will be described. In the threshold method, a user sets a numeric number from 1 to 100 as a threshold T. A processing apparatus calculates a minimum value $I_{min}$ and a maximum value $I_{max}$ of a signal and x coordinates ($x_{min}$ and $x_{max}$) providing these values on a signal profile. FIG. 4B shows an example of $I_{min}$ and $I_{max}$. Next, the position of the edge point is calculated according to the following equation. Herein, j is a variable indicating a left and right (R or L) of the edge and i is a variable specifying sampling places shown in Equation 1.

$$I(x_{ji}) = \frac{T}{100} \cdot (I_{max} - I_{min}) + I_{min} \quad \text{[Equation 4]}$$

In addition to this, $x_{ji}$ may be variously defined, but for clarity, the detection of the edge from the CD-SEM image is considered to use this method and the principle of the present invention will be described. The image processing conditions that should examine the corresponding relationship with h are values of T. Hereinafter, however, the image process condition is described using t that becomes t=T/100 instead of T. Thereby, any one of h and t is values from 0 to 1. When another definition is used, the same analysis may be performed by substituting parameters (a set of parameters in a case where there are plural parameters) defined by a user for t in this definition.

Even if the corresponding relationship between h and t may be derived using any LER indices (or LWR indices), a function that can treat, process, and display both AFM data and CD-SEM data in the same format on a graph is needed. When these are displayed on a graph, it is preferable that a traverse axis is t and h and a longitudinal axis has the index values. If these are displayed on a graph, the user sees the graph, such that he/she can approximately estimate the values of t corresponding to h. The present invention can generally be applied to various applications.

Further, a method that automatically calculates and outputs the corresponding relationship between h and t from digital data plotted on the above-mentioned graph can be considered. With the present invention, the user can calculate the index values according to a three-dimensional measurement in a shorter time.

There are many methods that can derive the relationship of h and t from two graphs. Among those, as a method that can easily derive the relationship in a short time, there is a method deriving the relationship through two steps described below. First, similar characteristic points in the shapes of two graphs are considered to be corresponding points. This is a point providing the maximum and/or minimum values or an inflection point. Thereby, there may be several areas where h and t are divided into characteristic points. Next, the area of h divided into the characteristic points corresponds to the area of t to find a point where the index values are matched within the corresponding area. The h and t providing the point have the corresponding correlation. The present invention can be performed in a shorter time. However, there may be a case where the corresponding relationship between h and t is not obtained when there is a lot of noise. A detailed example will be described below.

As the indices, the LER(3σ) or the LWR(3σ) that indicates the degree of roughness is generally used. They have high generality and can be applied to the pattern of any materials. Further, there is also a method that uses a deviation amount of the edge position or the skewness γ of the distribution of a local line width. This method is suitable for a case where the roughness in a wedge shape wedged in the pattern portion occurs. Further, there is also a method that uses an autocorrelation length ξ of the LER or the LWR. This is effective for the case where the roughness occurs at a specific period due to the problem of the material or process. The above-mentioned three methods will be described in detail.

Figure 5A:
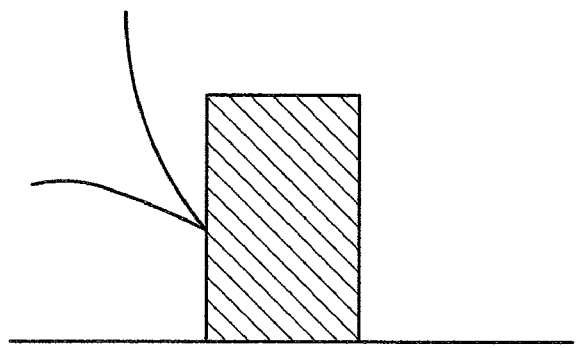
FIGS. 5A to 5C are schematic diagrams of a cross section when a pattern is observed with an AFM.
Figure 5B:
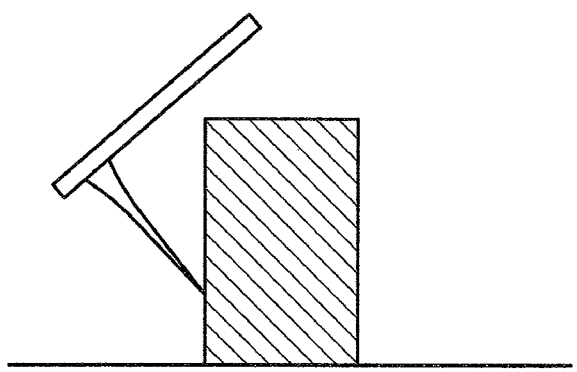
Figure 5C:
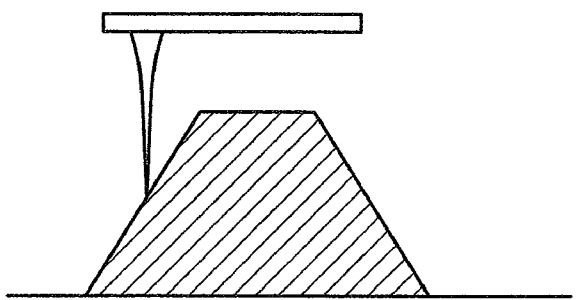

First, a method that calculates the corresponding relationship between h and t using the LER(3σ) or the LWR(3σ) is first described. In order to measure the LER with the AFM, three cases are considered. There are a case (hereinafter, described as case A) of using the AFM capable of measuring the CD, a case (hereinafter, described as case B) using an extra fine probe where an angle between a direction of dropping the probe to a wafer and the wafer surface become 90° or less, that is, a case inclinedly approaching the wafer, and a case (hereinafter, described as case C) approaching the wafer vertical to the wafer by vertically moving the general extra fine probe. A positional relationship between these probes and the pattern cross section is shown in FIGS. 5A to 5C. Since the probe having a special shape is used in case A, there is a problem in that a high frequency LER cannot be measured. Since it is difficult to observe a sidewall of the pattern in case C, there is a need to use the pattern of a forward taper (its cross section becomes a trapezoidal shape). These three cases are similarly applied to measuring the LWR with the AFM. In a case (case A') using the AFM capable of measuring the same CD as the above case A, there is a problem in that the edges at the left and right sides can be detected, however, similar to the case of the LER, the high frequency LWR cannot be detected. In a case of (case B') approaching with the same extra fine probe as case B, that is at an incline, since only any one of the left and right edges can be detected, the measurement should be performed twice while changing an angle in order to obtain the LWR. In a case (case C') of using the same general AFM as case C, similar to the case of the LER, the pattern is limited. Therefore, the case of case B that can obtain the highest precision and throughput will be described as an example.

Figure 6:
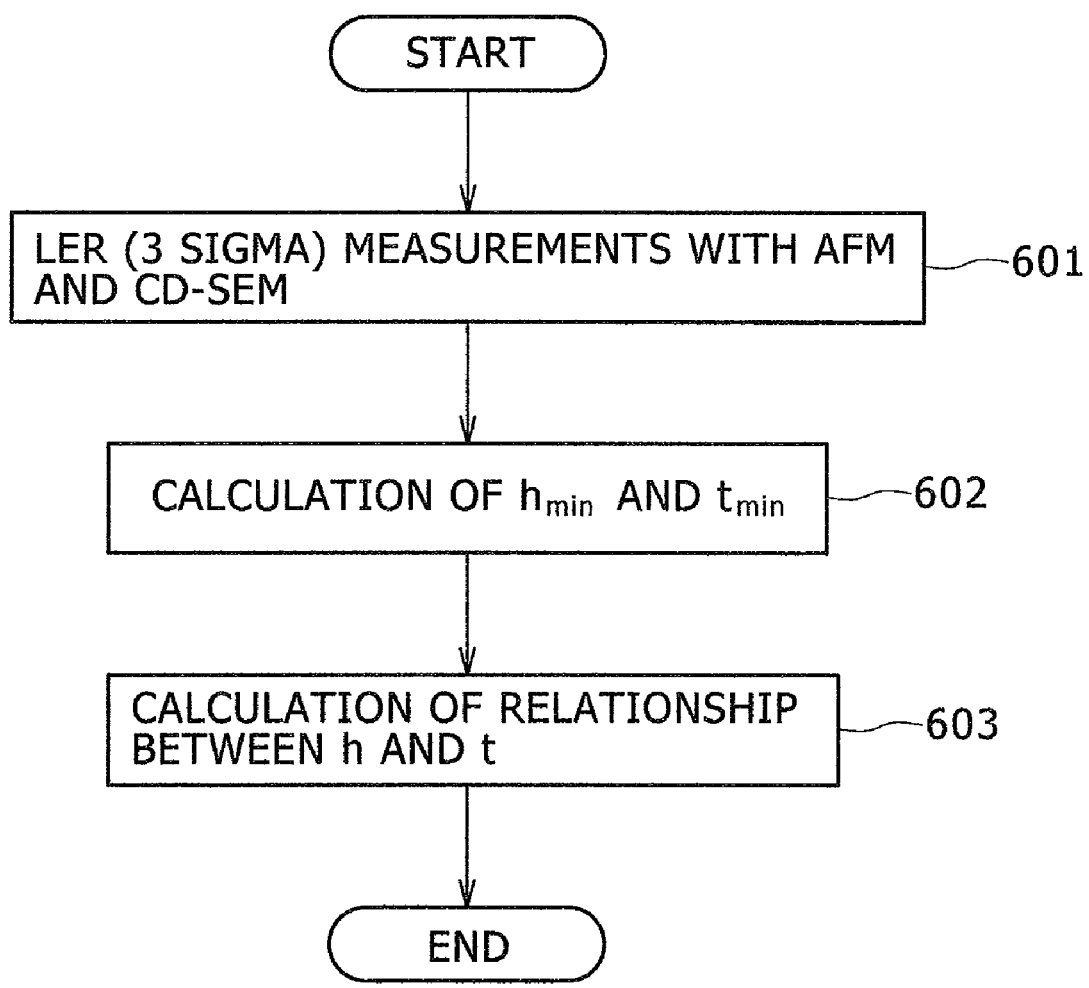
FIG. 6 is a flow chart indicating a sequence of measuring and comparing a size 3σ of an LER with the AFM and the CD-SEM used in the first embodiment when carrying out the present invention.

It is preferable that the line patterns comparing the results are the same at the AFM measurement and the CD-SEM measurement. Even if the line patterns are not same, the pattern should be considered to be created under the same conditions. Even if it is impossible to measure the completely same place, the area close to the place if possible is measured. The sequence is shown in FIG. 6.

Figure 7A:
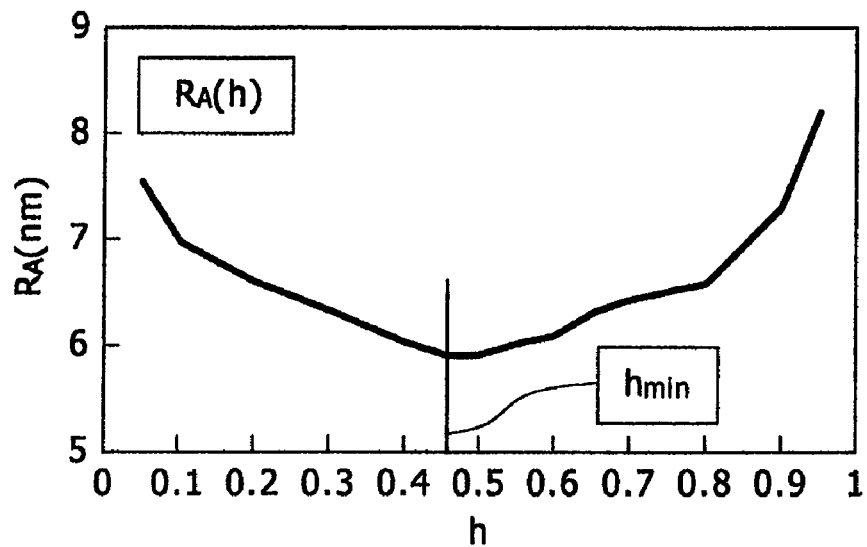
FIGS. 7A and 7B are diagrams showing a height of a pattern or edge point extraction parameter of the size of the LER that can be obtained according to the first embodiment.
Figure 7B:
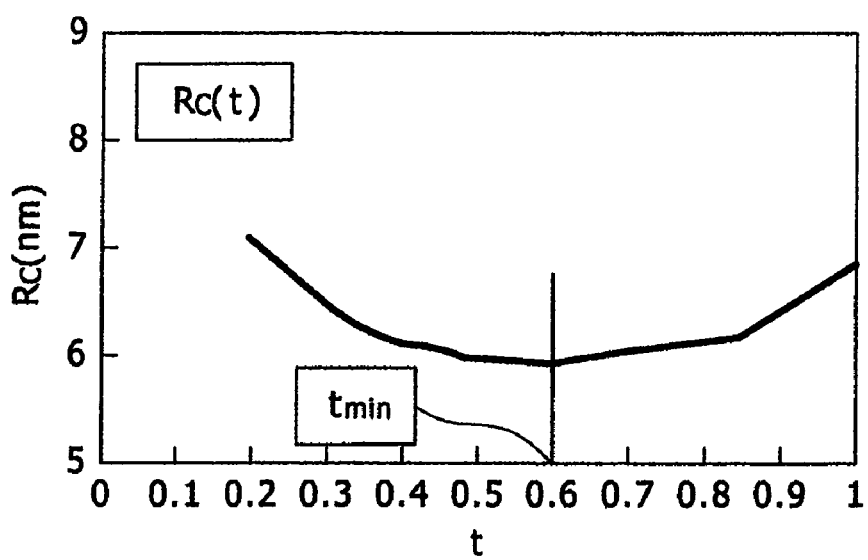

First, as shown in a process 601, the LER(3σ) at the same place if possible is measured using the AFM and the CD-SEM. Plural places on the same line or the line created under the same pattern formation conditions are measured. At this time, the totally measured line length should be 2 microns or more. For example, when the line edge length calculating the LER(3σ) is 200 nm, a long line is previously created and 10 places on the line edge are measured with the AFM. And, the LER(3σ) in an area close to the above-mentioned 10 places if possible is calculated with the CD-SEM. The obtained results are averaged. It is preferable to obtain a square sum average root rather than a general arithmetic average. Hereinafter, an average value of the LER(3σ) obtained with the AFM is marked by $R_A$ and an average value of the LER(3σ) obtained with the CD-SEM is marked by $R_C$. Herein, $R_A$ and $R_C$ each is 3σ, but these may be an integer multiple of σ or σ (excluding 3σ). However, as the conditions, the measurement uncertainty (variation) should be small, in particular, the effect of noise should be small in the CD-SEM. Even if the effect of the noise increases the LER values to the LWR values, that is, comes out in a form called a bias, the noise deriving bias can be removed. This method is described in detail in C. Nelson. et al. The typical h dependency on $R_A$ and the t dependency on $R_C$ are shown in FIGS. 7A and 7B. When h and t are small, that is, when the lower part of the pattern is measured, the LER becomes large so as to detect tailing. When h and t are large, the LER is also large so as to detect pattern top-rounding.

Next, it proceeds to process 602, which calculates a value $h_{min}$ of h providing the minimum value of $R_A$, and a value $t_{min}$ of t providing the minimum value of $R_C$, as seen from data shown in FIGS. 7A and 7B. The value of t on the CD-SEM image corresponding to the height (ratio of height) $h_{min}$ on the AFM data is $t_{min}$.

Next, it proceeds to process 603, which calculates the corresponding relationship between h and t. First, h that is h<$h_{min}$ may be obtained by resolving the following Equation 5.

$$R_A(h)=R_C(t), t<t_{min}$$ [Equation 5]

Further, h that is h>$h_{min}$ may be obtained by resolving the following Equation 6.

$$R_A(h)=R_C(t), t>t_{min}$$ [Equation 6]

Thereby, the values of t corresponding to any h from 0 to 1 are obtained.

Further, this method can be applied to other cases. However, in cases A and A', when LER(3σ) or LWR(3σ) is calculated from the CD-SEM, components having a frequency band that cannot be detected with the AFM should be removed. To this end, a method that largely averages the images in a longitudinal direction is considered. Using the degree (3•) of LER or LWR described herein has the following merits. There are several metrics to represent a shape such as LER, LWR, CD, but this can simply remove the effect of the noise from 3• measured from the CD-SEM (noise is included when the spectrum or the auto-correlation length is used). This method is disclosed in JP-A-2006-215020. If 3• not including noise is used, the relationship between h and P can be more accurately obtained.

Second, a method that calculates the corresponding relationship between h and t will be described using the deviation amount of the edge position or the skewness γ of the distribution of the local line width. When detecting the LER and LWR, as described in the description of the first method, cases A, B, C, A', B', and C' are considered. The advantages and disadvantages thereof are described in the description part of the first method. Hereinafter, similar to the second method, case B will be described. Further, it is assumed that the left edge is measured.

It is preferable that the line patterns comparing the results are the same at the AFM measurement and the CD-SEM measurement. Even if the line patterns are not same, the pattern should be created under the same conditions. Further, it is preferable that the area measured with the AFM is a portion of the area measured with the CD-SEM.

Figure 8A:
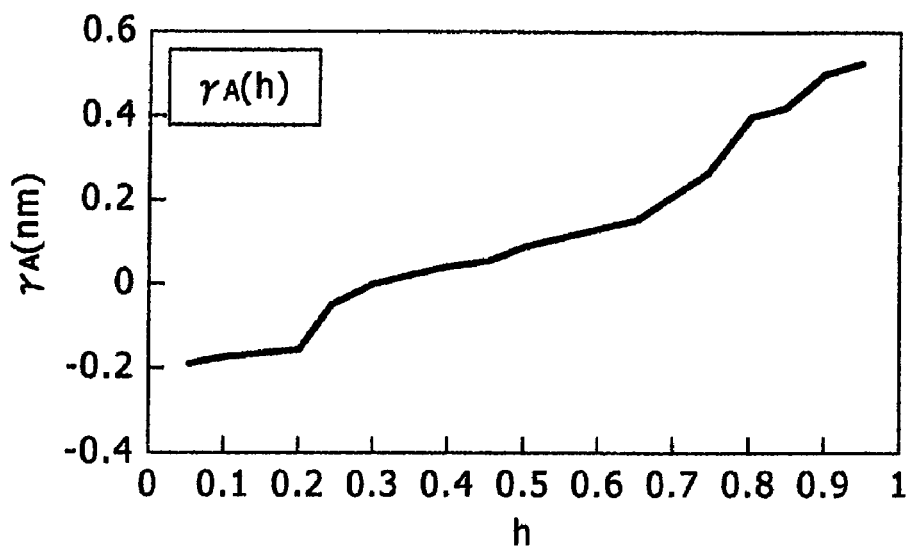
FIGS. 8A and 8B are diagrams showing a height of a pattern or an edge point extraction parameter of γ of an LER that can be obtained according to a second embodiment.
Figure 8B:
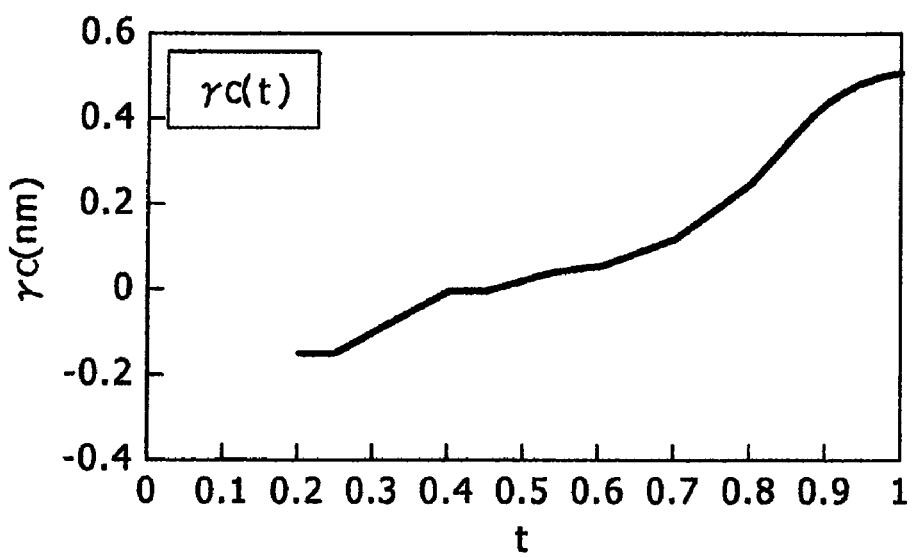

In this method, instead of 3•, γ is calculated by the same sequence as one carried out by the first method. γ obtained from the AFM measurement is marked by $γ_A$ and γ obtained from the CD-SEM measurement is marked by $γ_C$. The typical h dependency and t dependency on these amounts become as shown in FIGS. 8A and 8B. Since the corresponding relationship of $γ_A$ and h and $γ_C$ and t is an approximately one-to-one correspondence relationship, t corresponding to h is obtained from the following Equation 7.

$$γ_A(h)=γ_C(t)$$ [Equation 7]

Finally, a method that calculates the corresponding relationship between h and t using the correlation length ξ of LER or LWR will be described. As described above, it is assumed that the left edge is measured using an apparatus of case B.

It is preferable that the line patterns comparing the results are the same at the AFM measurement and the CD-SEM measurement. Even if the line patterns are not same, the pattern should be created under the same conditions. Further, it is preferable that the area measured with the AFM is a portion of the area measured with the CD-SEM.

Figure 9A:
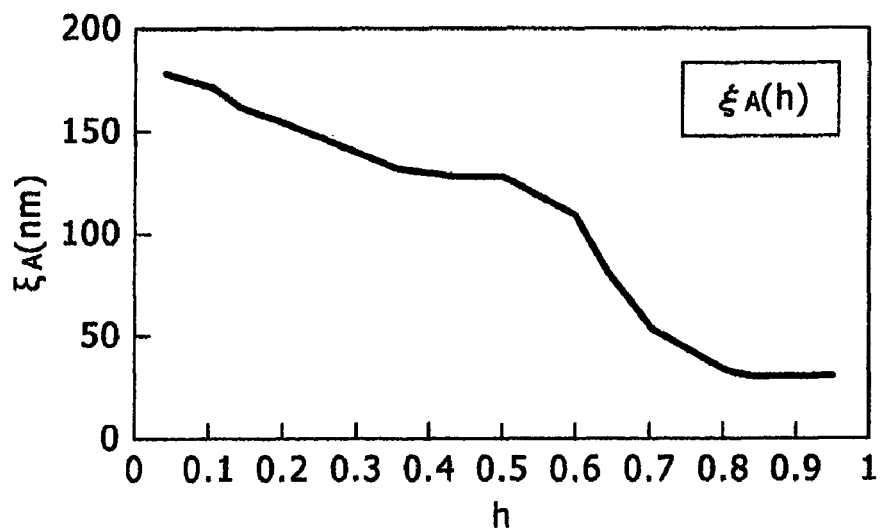
FIGS. 9A and 9B are diagrams showing a height of a pattern or an edge point extraction parameter of ξ of an LER that can be obtained according to a third embodiment.
Figure 9B:
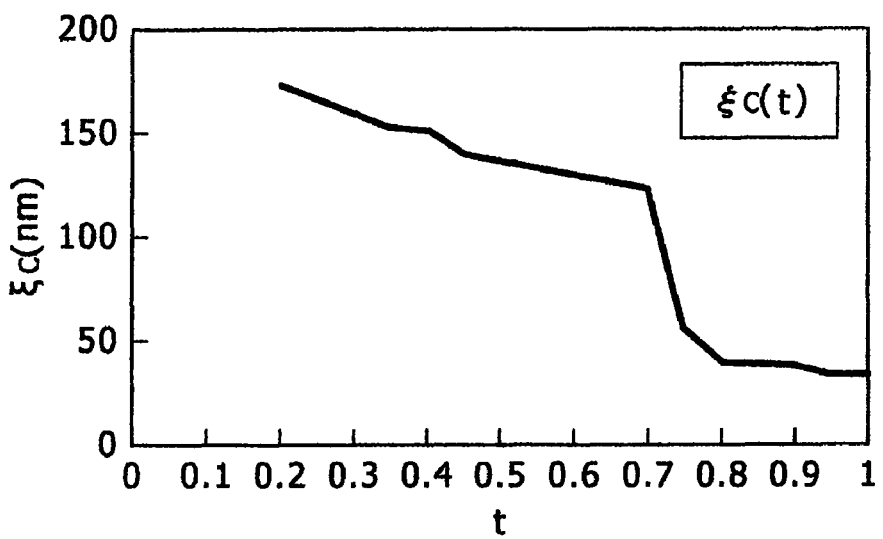

In this method, instead of 3•, ξ is calculated by the same sequence as one carried out by the first method. ξ obtained from the AFM measurement is marked by $ξ_A$ and ξ obtained from the CD-SEM measurement described as $ξ_C$. The typical h dependency and t dependency on these amounts become as shown in FIGS. 9A and 9B. Since the corresponding relationship between $ξ_A$ and h and $ξ_C$ and t is an approximately one-to-one corresponding relationship, t corresponding to h is obtained from the following Equation 8.

$$ξ_A(h)=ξ_C(t)$$ [Equation 8]

When obtaining the corresponding relationship between h and t, there is also a method using a set of data rather than one value as described so far. A method that calculates the corresponding relationship between h and t using the spectrum of LER or LWR will be described. When detecting the LER and LWR, as described above, cases A, B, C, A', B', and C' are considered. Each of the advantages and disadvantages is the same as the description of the method using the LER(3•) and LWR(3•). Hereinafter, case B will be described. Further, it is assumed that the left edge is measured.

It is preferable that the line patterns comparing the results are the same at the AFM measurement and the CD-SEM measurement. Even if the line patterns are not same, the pattern should be created under the same conditions. Further, it is preferable that the area measured with the AFM is a portion of the area measured with the CD-SEM.

First, the long line is observed using the CD-SEM, the position of the edge point is calculated using the threshold level t, the deviation amount of the edge position $Δx_{L,i}$ (i=1, 2, ... n) is obtained, Fourier transform is performed thereon, and then the power spectral intensity is obtained. It is preferable that the line length is 200 nm or more. Further, it is preferable that the above process should be performed at every place in order to obtain the average value of the power spectral intensity. It is assumed that the Fourier power spectrum of LER obtained from the observation results with the CD-SEM is $P_C$(t;f) (f is a spatial frequency). Next, the pattern shape of a portion of the area observed with the CD-SEM or a portion close to the area is observed using the AFM to obtain the edge point at the position of the height h, and similar to the case of the CD-SEM, the obtained edge point is subjected to Fourier transform to obtain the power spectral intensity. Moreover, similar to the case of the CD-SEM it is preferable that the above process should be performed at every place in order to obtain the average value of the power spectral intensity. It is assumed that the Fourier power spectrum of LER obtained from the observation results with the AFM is $P_A$(h; f).

Further, the above process may be applied to the LWR rather than the LER.

If the graph of these spectrums is displayed, the user views the graph thereof, such that he/she can approximately estimate the values of t corresponding to h. In the present invention, since the relationship between h and t is obtained through data having a large amount of information, which is a spectrum, rather than one index value, the precision becomes high.

Further, it is possible to automatically calculate and output the corresponding relationship between h and t from the digital data plotted on the above-mentioned graph. For the spectrum specifying h, connectivity of $P_C(t;f)$ of various values of t is examined. When the values of t where $P_A(h;f)$ matches $P_C(t;f)$ are found in the range of the values of f in which both $P_A(h;f)$ and $P_C(t;f)$ can reside, t corresponds to h. With the present invention, the user can obtain an accurate relationship between h and t in a short time.

Further, the spectrum of a wide frequency band or the LER(3•) and LWR(3•) can be obtained from the analysis image data by using the above method. After performing the described analysis according to the above-mentioned method, it is preferable that $P_C(t;f)$ and $P_A(h;f)$ for the specified h are merged. Thereby, it is possible to obtain a power spectrum having a wider frequency band. Further, it is possible to obtain a value equal to a square of σ for the LER or LWR obtained by measuring the long line at a small sampling interval by integrating the power spectrum having a wide frequency band obtained by this method. If the square root of the value is three, it becomes the index indicating the degree of LER or LWR. With the present invention, it is possible to obtain a 3• value having high precision simultaneously while providing the corresponding relationship between h and t.

Further, in various methods capable of accurately evaluating the three-dimensional shape in a short time described so far, the high H of the pattern may be measured using the sampling that is previously known. This depends on the following reason. For example, a case where the present invention is applied to a resist pattern and observed after lithography is considered. It is assumed that there are two samples created by the same complete process except for a thickness of a resist film. The height H of the pattern is different in the two samples. If the relationship between h and t obtained by observing one pattern is used and the other pattern is observed with the CD-SEM to obtain the three-dimensional LER index, the precision depends on the difference in the heights of the two patterns. If the heights of the patterns are largely different, there is a case where the relationship between h and t obtained from one pattern cannot be applied to the other pattern. Consequently, it is preferable to perform the measurement on the pattern that has some values of H that are previously known. Thereby, the precision of the three-dimensional index measurement is improved.

Further, in order to improve the productivity of the semiconductor manufacturing process by performing the various methods capable of accurately evaluating the three-dimensional shape described above in a short time, a need exists for a system that obtains the relationship between h and t and then can perform the CD-SEM measurement immediately reflecting the obtained relationship.

In the above-mentioned method, the parameters used in obtaining the relationship between h and t may include ones processing the positional data of the edge such as 3•, γ. However, there is a more direct method. This method is a method that compares the positional data of the edge, that is, the set of the edge points itself. If the set of the edge points obtained from the atomic force microscope and the set of the edge points obtained from the CD-SEM image are displayed in parallel, it can be appreciated that they correspond to any condition by having a user comparing them by sight. Further, if the correlation coefficient between the set of the edge points obtained from the different observation apparatus is obtained, it can be appreciated that the obtained correlation coefficient corresponds to any conditions. Since the method does not need the data processing, it is performed in a short time. This method can be performed without a Fourier transform function. However, this method can easily be affected by noise (that is, if the image having a lot of noise is used, the precision is bad) and there is a problem in that the same complete place should be observed with different observation apparatus. Meanwhile, if the pattern is made of a material strong against irradiation of electron beams, it is possible to obtain an image having small noise by making the observation time long in the CD-SEM observation. In such a case and a case that can simply perform the observation of the same place, this method is a method that can obtain high precision.

When the method of mutually comparing the sets of the edge points is performed, it is preferable that one of h and t is fixed and dependency on the variable of the other of the correlation coefficients is obtained. When the correlation coefficient is at the maximum, it can be appreciated that h and t has the corresponding relationship. With the present invention, the corresponding relationship between h and t can be more precisely obtained in a short time.

When the above method is performed, it is preferable that the system records the corresponding relationship between h and t obtained in a recording medium and takes out the data in the CD-SEM observation, if necessary. Thereby, the efficiency of the inspection is improved by simply performing the three-dimensional measurement of the LER or the CD.

First Embodiment

Figure 10:
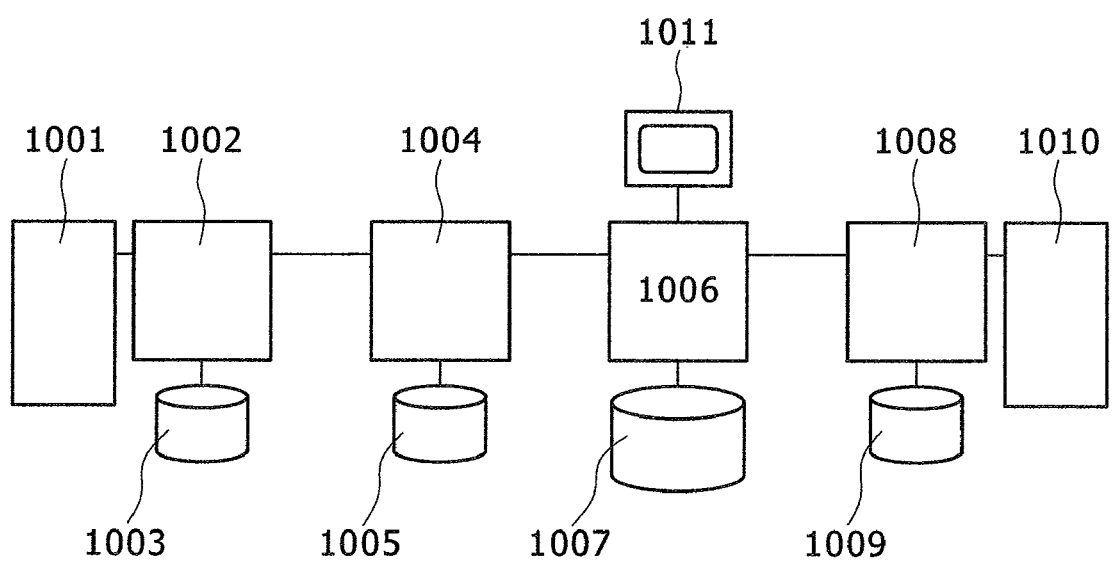
FIG. 10 is a diagram showing a configuration of an apparatus for data analysis used in the first, second, third, fourth, and fifth embodiments.
Figure 17:
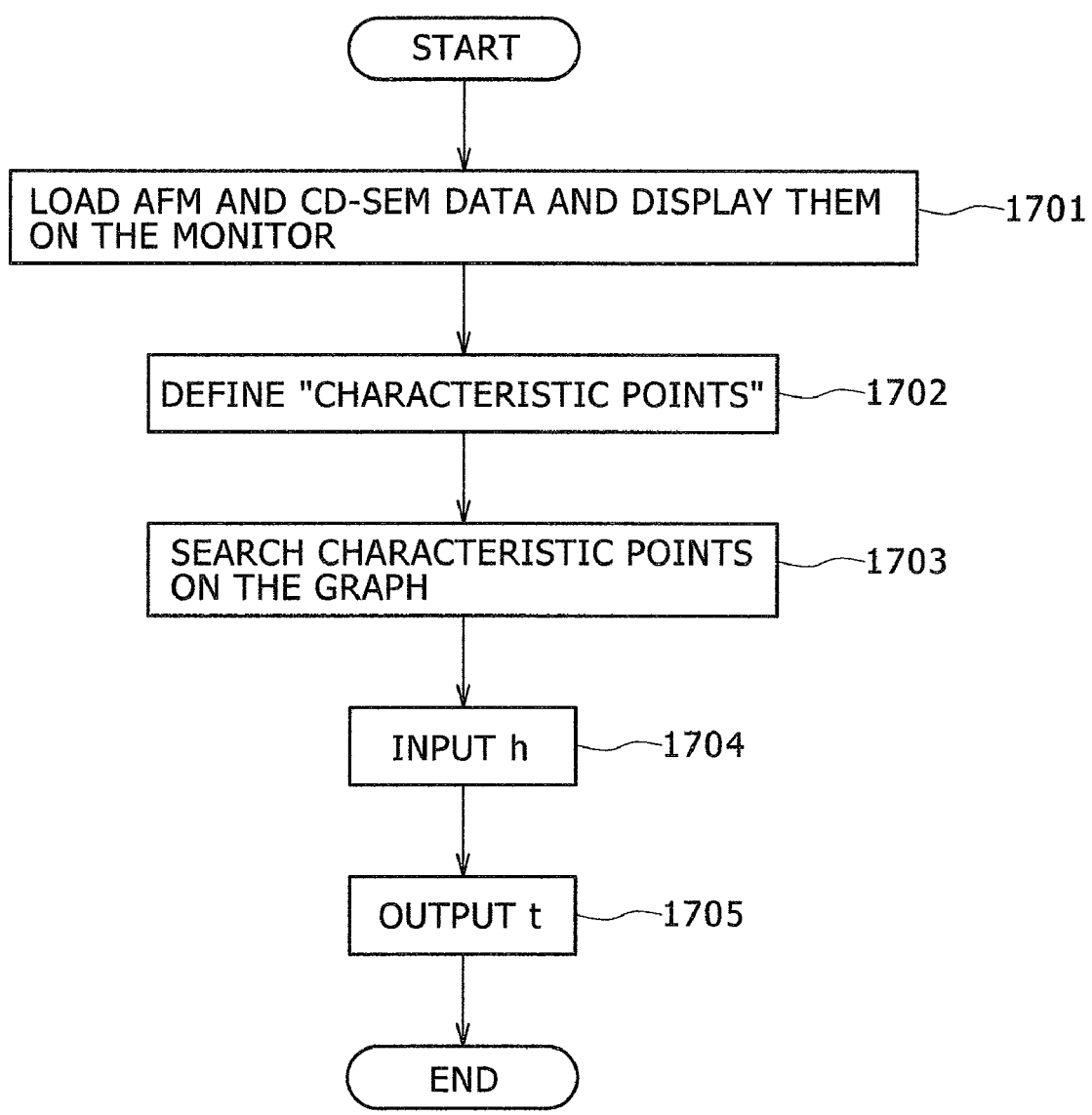
FIG. 17 is a flow chart for explaining a part of a sequence when a corresponding relationship between values of h and t used in the first embodiment is automatically obtained.
Figure 18:
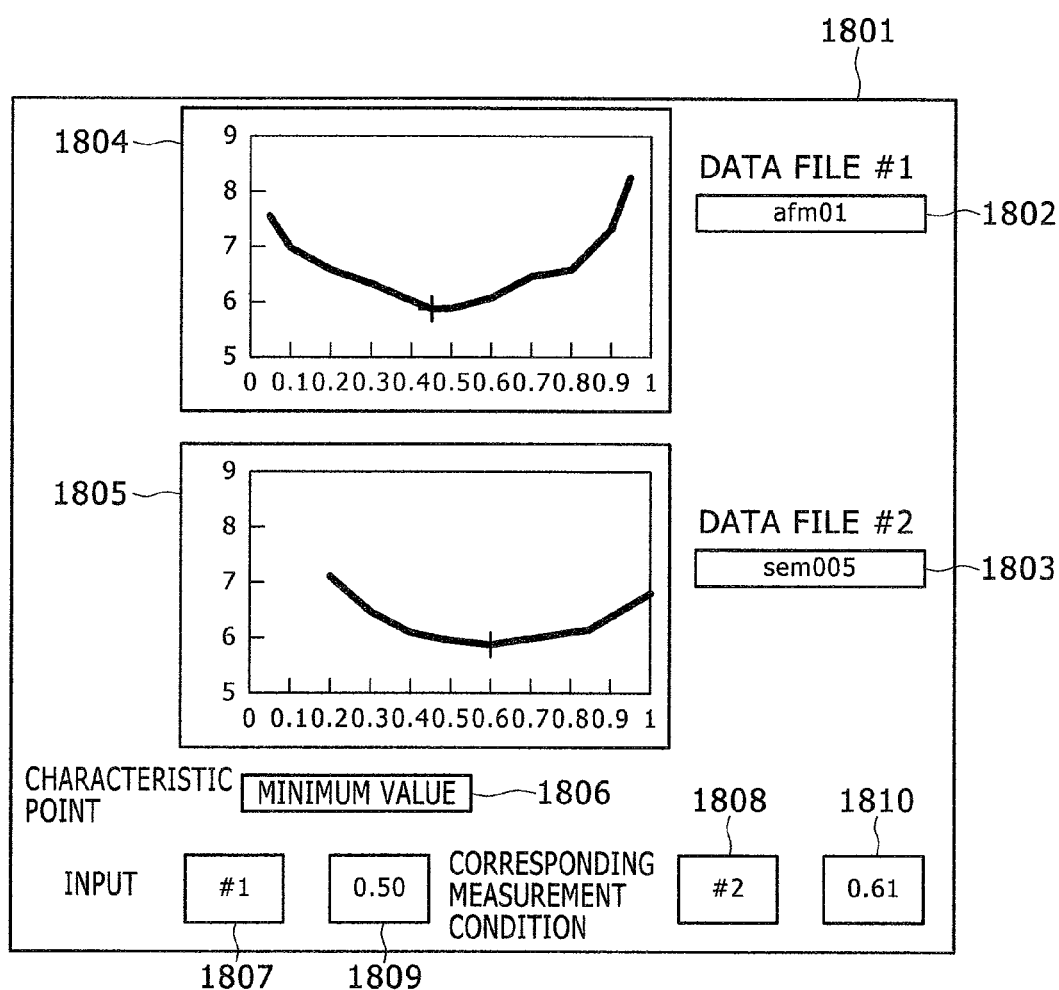
FIG. 18 is a diagram showing a GUI screen when a corresponding relationship between the values of h and t used in the first embodiment is calculated.

A first embodiment will be described with reference to FIGS. 2, 3, 6, 7A and 7B, 10, 17, and 18. FIG. 2 is a cross-sectional view when a pattern is cut in a plane parallel with a substrate, FIG. 3 is a schematic diagram showing a CD-SEM image, FIG. 6 is a flow chart indicating some sequences of the first embodiment, FIGS. 7A and 7B are diagrams showing dependency on edge-extraction parameters or a height of a pattern of the size of the LER that can be obtained according to the first embodiment, and FIG. 10 is a conceptual diagram showing a connection form of components of a system used in the first embodiment. FIG. 17 is a flow chart showing a sequence of an operator's operation and calculation performed by a computer when the first embodiment is automatically performed and FIG. 18 is a diagram showing an example of a image display on a display device.

The first embodiment describes a case where image processing conditions of a CD-SEM image corresponding to a height of a pattern are obtained when extracting an edge position from AFM data by using 3σ that is an index of a size of an LER.

h, which specifies a position of points on a pattern surface obtained from the AFM data, is a value that divides a distance H from a substrate of points by the height of the pattern (in an area to be inspected). Further, when extracting the edge from the CD-SEM, the threshold method represented by Equation 4 is used. Therefore, the CD-SEM image processing condition, which should correspond to h, is a threshold level T represented by Equation 4. t is calculated instead of T by assuming 1/100 of T of Equation 4 as t. Since in order to perform the measurement, the operator needs to extract the edge where h=0.5, an object of the first embodiment is to obtain the values of t corresponding to h=0.5.

The image for any resist pattern sample is previously obtained using the CD-SEM that is configured (FIG. 10) of a main body 1001, a control system 1002, and a memory area 1003. The height of the pattern is 500 nm. Data accompanied by the image is transmitted to a workstation 1004 for processing the CD-SEM image and is recorded in a memory area 1005 connected to the work station 1004. Further, an area in which the same sample is positioned at the same position is observed with the AFM that is configured of a main body 1010, a control system 1008, and a memory area 1009 to obtain data. The data is recorded in the memory area 1009.

Next, a sequence of obtaining the values of t corresponding to h=0.5 using the previously obtained data as described above will be described. The sequence is shown in FIG. 6.

First, a process 601 is performed. In detail, the process is as follows. The operator calls the AFM data and the CD-SEM data, respectively, from the memory areas 1005 and 1009 by operating a computer 1006 of FIG. 10, the AFM data and the CD-SEM data being obtained by observing the same pattern on a wafer. The CD-SEM image is schematically shown in FIG. 3. Next, the edge where h=0.5 is extracted from the AFM data. The edge shape is shown in FIG. 2.

First, the targeted edge was assumed to be a left edge. FIG. 2 shows when the pattern is cut in a surface existing at a distance corresponding to 50% of the height of the pattern from a surface that is a reference. The edge corresponds to reference numeral 201. Further, the CD-SEM image of a line pattern including the edge is schematically shown in FIG. 3. The edge corresponding to reference numeral 201 corresponds to an area 302 where an SEM signal is strong.

Next, an inspection area, that is, an area used for calculating the LER is defined. In FIG. 2, it is assumed that the edge to be inspected is a portion within an area 204 among reference numeral 201. The area in the CD-SEM corresponding to the portion is an area 303. Further, when the observation is previously performed with the AFM and the CD-SEM, the corresponding area can be found by accurately defining the observation position. Herein, if reference numeral 303 is specified as the inspection area, since the area for searching the edge is unnecessarily wide, the operator specifies an area 304 (a length of a side along a line is the same as reference numeral 303) included in reference numeral 303 as the inspection area again with visual inspection.

Next, a set of discrete points $\{(x_{ji}, i\Delta y)|i=1, 2, \ldots n\}$ (since the left edge is analyzed herein, j=L) that represents reference numeral 201 within the specified area 204 is extracted from the AFM data.

Next, straight lines that describe in more detail the set of the edge points are obtained and a difference $\Delta x_{Li}$ between the edge point $x_{Li}$ and an x coordinate of an approximation straight line is obtained on each straight line 203 represented by Equation 1. The difference is 5.92 nm as a result of calculating the distribution of $\Delta x_{Li}$ and calculating three times a standard deviation thereof. This is marked by the LER and $R_A$ (0.5) of the AFM in h=0.5. Further, the LER to be obtained herein is a value in the case of h=0.5, but h is changed from 0.1 to 1.0 by 0.1 increment and the above-mentioned sequence is performed.

Next, the same data is obtained from the CD-SEM image. First, the position of the edge point in the area 304 is calculated by the threshold method. The threshold level t is changed from 0.1 to 1.0 by 0.1 increment, the position of the edge is represented by data of discrete points, the approximation straight line that descrbes in more detail the set of the edge points is obtained, the difference between the edge point and the x coordinate of the approximation straight line is obtained on each straight line represented by Equation 1, and the LER obtained by observing three times the standard deviation of the distribution with the CD-SEM is defined. The LER obtained with the CD-SEM observation becomes a function of t. This is marked by as $R_C(t)$.

The h dependency of $R_A(h)$ and the t dependency of $R_C(t)$ that are obtained by the above-mentioned process are shown in FIGS. 7A and 7B.

Next, the correspondence relation between h and t is obtained. First, it proceeds to a process 602, which allows h and t, which provide local minimum points of two graphs as $R_A(h)$, $R_C(t)$, to correspond to each other (hereinafter, described as $h_{min}$ and $t_{min}$*. As results obtained therefrom, $h_{min}$=0.45 and $t_{min}$=0.60. In other words, it is assumed that the edge point where h=0.45 corresponds to the edge point extracted from the CD-SEM image using t=0.60. Next, it proceeds to a process 603. 0.5 that is a value of h to be obtained is larger than a value $h_{min}$. It is determined that t corresponding to h=0.5 is larger than 0.60 that is a value of $t_{min}$. Next, t represented by the following Equation 9 is searched in the range of t that is t>$t_{min}$(=0.60).

$$R_A(0.5)=R_C(t) \quad \text{[Equation 9]}$$

A left side of Equation 9 is 5.97 nm and t is equal to 0.61.

According to the foregoing description, in order to extract the edge point where h=0.5 in the AFM from the CD-SEM image, it can be appreciated that it is preferable to set t=0.61 by the threshold method. Then, all the processes shown in FIG. 6 end.

Thereafter, in the measurement of LER, CD, LWR, it is possible to simply measure LER, CD, LWR at a position corresponding to half the height of the pattern at high speed by using t=0.61, the precision and speed of the measurement of the pattern dimension are improved, and the yield of the semiconductor device created using the pattern is improved. Further, in the above description, when comparing two graphs, local minimum points of two graphs are illustrated but it may of course use a minimum value, a maximum value, a local maximum value, an inflection point, etc., as points characterizing the shape of the graphs. In the present specification, they are collectively called the points characterizing the form of the graph or characteristic points of the shape of the graphs.

Further, it is possible to automatically perform the processes 602 and 603. Hereinafter, the data of $R_A(h)$ and $R_C(t)$ shown in FIGS. 7A and 7B is recorded in a memory area 1007 once and a sequence when the conditions of t corresponding to h=0.5 is obtained using application software operated on the computer 1006 will be described with reference to FIG. 17.

First, if the operator executes the software on the computer 1006, a window shown by reference numeral 1801 in FIG. 18 is opened on a display device 1011 of the computer 1006 of FIG. 10. At this time, nothing is displayed on the display areas of reference numerals 1802 to 1810. Next, it proceeds to a process 1701 of FIG. 17 and the operator executes the following matters. There are two data files to be loaded. The display area 1802 on the display is clicked. Then, the window is opened and the data file name to be loaded is displayed. The operator selects a file having a name called afm01. This is the data of the AFM. Then, the file name is displayed on the display area 1802 and at the same time, $R_A(h)$ is displayed as a graph on the display area 1804. Next, if the operator clicks the display area 1803, the window is opened and a data file name to be loaded is displayed thereon. The operator selects a file having a name called sem005. This is the data of the CD-SEM. Then, the file name is displayed on the display area 1803 and at the same time, $R_C(t)$ is displayed as a graph on the display area 1805.

Next, it proceeds to a process 1702 of FIG. 17. The operator pulls down the display area 1806 to display a minimum value, a maximum value, a local minimum value, a local maximum value, an inflection point, or a specified y value that indicate the characteristic points of the shape of the graphs. Among those, the minimum value is selected. Then, a process 1703 is performed in the computer 1006 and 0.45 and 0.60 are obtained as the values of h and t providing the minimum values of two graphs, that is, $h_{min}$ and $t_{min}$. Further, a cross-shaped marker is automatically attached on a portion where the y coordinate is a minimum value on the graphs displayed on the display areas 1804 and 1805.

Next, it proceeds to a process 1704 and the operator pulls down the display area 1807 of an input condition column to display data files #1 and #2. And, the operator selects data file #1. Then, the other data file #2 is automatically displayed on the display area 1808. Next, the values interested by the operator among values of variable h of the data file #1 is input to the display area 1809. Herein, h is 0.50.

Then, it proceeds to a process 1705 and the computer 1006 executes calculation. The value 0.5 is larger than $h_{min}$. The computer calculates the values of t satisfying Equation 9 in an area where $t > t_{min}$. This value is 0.61. The value 0.61 is displayed on the display area 1810. The display screen of FIG. 18 shows an example of a screen at this process.

Further, there may be a case where the local minimum point as shown in FIGS. 7A and 7B is not shown in a graph. In this case, since the graph is monotonically increased or decreased, only one of the values of t where $R_A(h)=R_c(t)$ for any h is obtained or the values of t are not obtained. In the case where only one of the values of t is obtained, the value is t corresponding to h. In the case where the values of t are not obtained, the CD-SEM measurement corresponding to the extraction of the point having the height h cannot be performed.

Moreover, the above-mentioned process is also applied to a sample whose height is previously known as 100 nm, such that t=0.45. These obtained results are stored in the memory area 1007. Thereafter, in the mass-production process, the LER measurement is performed with the CD-SEM observation by using the results obtained from the sample of 100 nm in the case of a relatively thin thickness that resist film thickness is 100 to 200 nm and the results obtained from the sample of 500 nm in the case of a relatively thick thickness that resist film thickness is 400 to 600 nm, making it possible to measure the LER corresponding to h=0.5 at higher precision.

Second Embodiment

A second embodiment of the present invention will be described with reference to FIGS. 8A and 8B. In the second embodiment, a case of obtaining the image processing conditions of the CD-SEM image corresponding to the height of the pattern when extracting the position of the edge from the AFM data by using the skewness γ that is an index of the asymmetry property of the LER will be described. Further, FIGS. 8A and 8B are graphs of dependency on the edge-extraction conditions of γ obtained from the AFM observation results and the CD-SEM observation results.

h, which specifies the position of the point on the pattern surface obtained from the AFM data is the same as the first embodiment, is a value dividing the distance between the substrate and the points by the height of the pattern (in the area to be inspected). Further, when extracting the edge from the CD-SEM, the threshold method represented by Equation 4 is used. Therefore, the CD-SEM image processing condition, which should correspond to h, is the threshold level T represented by Equation 4. t is calculated instead of T by assuming 1/100 of T of Equation 4 as t.

The system used is the same as one described in the first embodiment (see FIG. 10). The pattern observed is a line pattern made of a dielectric material. The pattern observation is performed using the AFM and the CD-SEM according to the same sequence as the first embodiment to obtain each result. Further, the condition obtained by the operator is a value of t corresponding to h=0.4.

Next, the edge point when h is changed from 0 to 1.0 by 0.05 increment is obtained from the AFM data according to the same sequence as one described in the first embodiment. Moreover, the edge point when t is changed into from 0 to 1.0 by 0.05 increment is also obtained from the CD-SEM data. However, the results are not obtained under the conditions of h=0, 1.0 and t=0–0.15 due to the effect of noise.

The distribution of the x coordinate of the edge points obtained with respect to the values of h or t is calculated, making it possible to calculate the skewness γ of the distribution. γ obtained from the AFM data is marked by $γ_A(h)$ and γ obtained from the CD-SEM data is marked by $γ_C(t)$. In the second embodiment, $γ_A(h)$ and $γ_C(t)$ obtained by performing the calculation are shown in FIGS. 8A and 8B.

Next, in the case of h=0.3, t satisfying Equation 7 is calculated from the data of the graph. The value is t=0.4.

Thereafter, in the measurement of LER, CD, LWR or γ, these index values corresponding to h=0.3 can be simply measured at high speed by using t=0.4, the precision and speed of the pattern shape measurement can be improved, and the yield of the semiconductor device created by using the pattern is improved.

Moreover, $γ_A(h)$ or $γ_C(t)$ may not be the graph of the monotonic increase or the monotonic decrease as shown in FIGS. 8A and 8B and may have a local minimum point or a local maximum point that is the characteristic point of the shape of the graph. In this case, it is preferable to obtain the values of t after the local minimum points or the local maximum points correspond to each other as described in the first embodiment.

Third Embodiment

A third embodiment of the present invention will be described with reference to FIGS. 9A and 9B. In the third embodiment, the case will be described where the correlation length that is an index of a characteristic width of the roughness of the LER (roughness in a y direction) is used and the image processing conditions of the CD-SEM image corresponding to the height of the pattern when the position of the edge is extracted from the AFM data are obtained. Further, FIGS. 9A and 9B are graphs of ξ obtained from the AFM observation results and the CD-SEM observation results and the dependency on the edge-extraction conditions. h, which specifies the position of the point on the pattern surface obtained from the AFM data is the same as the first embodiment, is a value dividing the distance between the substrate and the points by the height of the pattern (in the area to be inspected). Further, when extracting the edge from the CD-SEM, the threshold method represented by Equation 4 is used. Therefore, the CD-SEM image processing condition that should correspond to h is the threshold level T represented by Equation 4. t is calculated instead of T by assuming 1/100 of T of Equation 4 as t.

The system used is the same as one described in the first embodiment and has a configuration shown in FIG. 10, and the image analyzed is the same as one used in the second embodiment. The pattern observation is performed using the AFM and the CD-SEM according to the same sequence as the first embodiment to obtain the same results as the second embodiment. Further, the condition obtained by the operator is a value of t corresponding to h=0.7.

Next, the edge point when h is changed from 0 to 1.0 by 0.05 increment is obtained from the AFM data according to the same sequence as one described in the first embodiment. Moreover, the edge point when t is changed into from 0 to 1.0 by 0.05 increment is obtained. However, the results are not obtained under the conditions of h=0, 1.0 and t=0–0.15 due to the effect of noise.

The y coordinate dependency on the x coordinate of the edge point obtained with respect to the values of h or t is calculated and the correlation length ξ of the LER is obtained using Equation 3 from the results. Herein, the p values of Equation 3 that determine the definition of ξ is 1/e. ξ obtained from the AFM data is marked by $ξ_A(h)$ and ξ obtained from the CD-SEM data is marked by $ξ_C(t)$. In the third embodiment, $ξ_A(h)$ and $ξ_C(t)$ obtained by performing the calculation are shown in FIGS. 9A and 9B.

Next, it allows the characteristic points of the graph to correspond to each other. Hereinafter, a case subjected to a visual inspection will be described. The operator that visually inspects the graph of FIGS. 9A and 9B has determined that h=0.6 corresponds to t=0.7. Thereby, t corresponding to h where h>0.6 should exist in the area where t>0.7. Herein, since t corresponding to h=0.7 is obtained, t satisfying Equation 8 in the case of h=0.7 is searched from a graph to obtain t=0.75 in the area where t>0.7.

Thereafter, in the measurement of LER, CD, LWR or γ, these index values corresponding to h=0.7 can be simply measured at high speed by using t=0.75, the precision and speed of the pattern shape measurement can be improved, and the yield of the semiconductor device created by using the pattern is improved.

Fourth Embodiment

Figure 11:
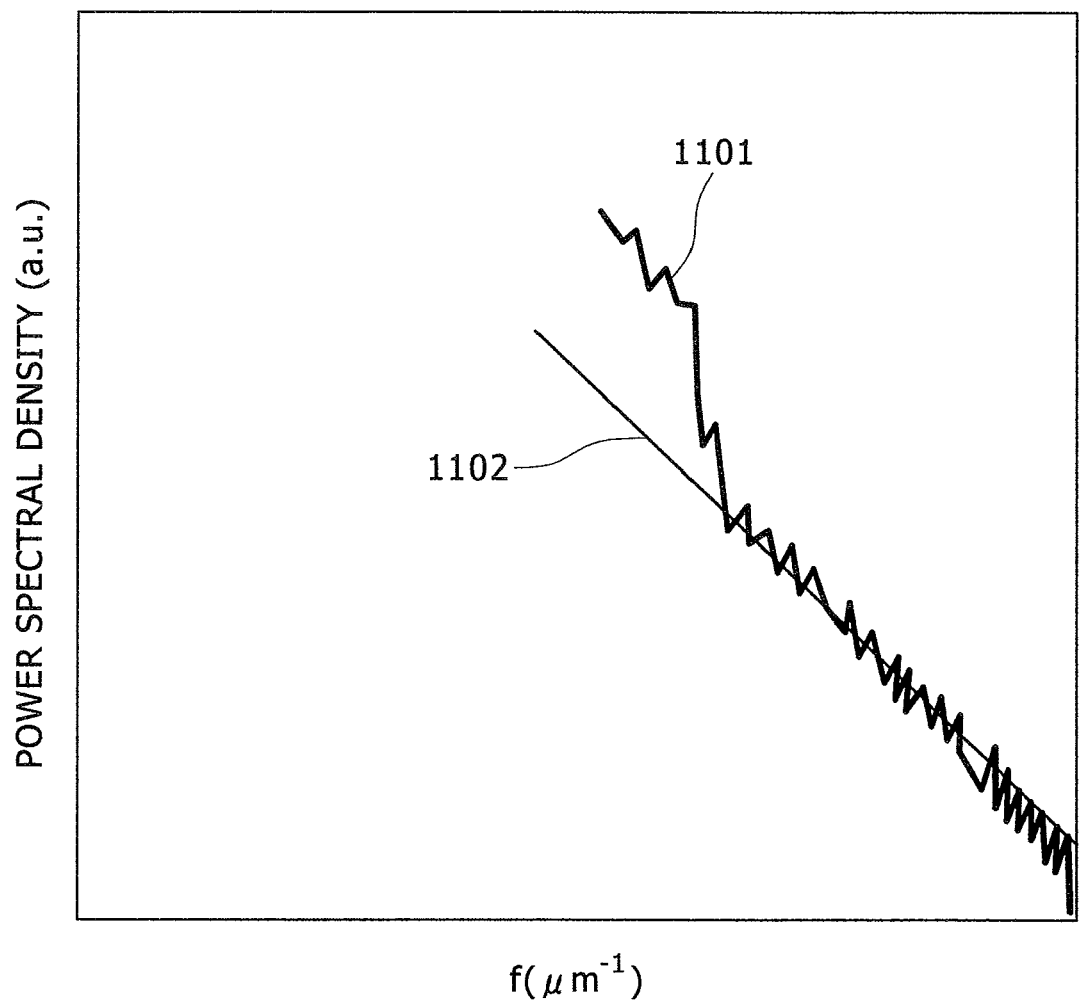
FIG. 11 is a diagram showing a spectrum of an LER obtained from observation results with an AFM according to a fourth embodiment.
Figure 12:
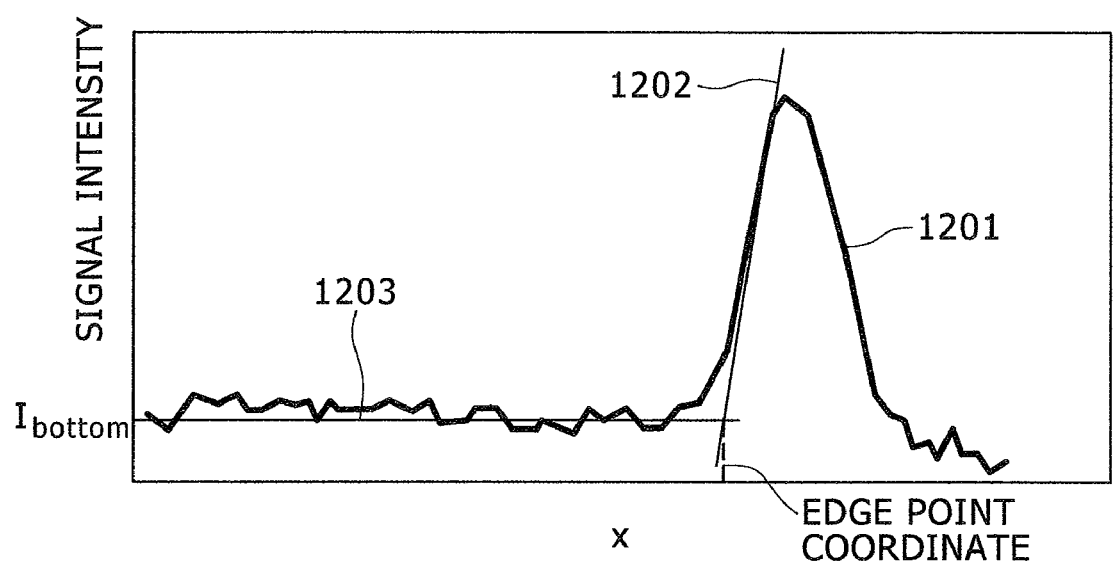
FIG. 12 is a schematic diagram used when a method for extracting edge points from a signal profile is explained by a direct approximation method according to the fourth embodiment.
Figure 13:
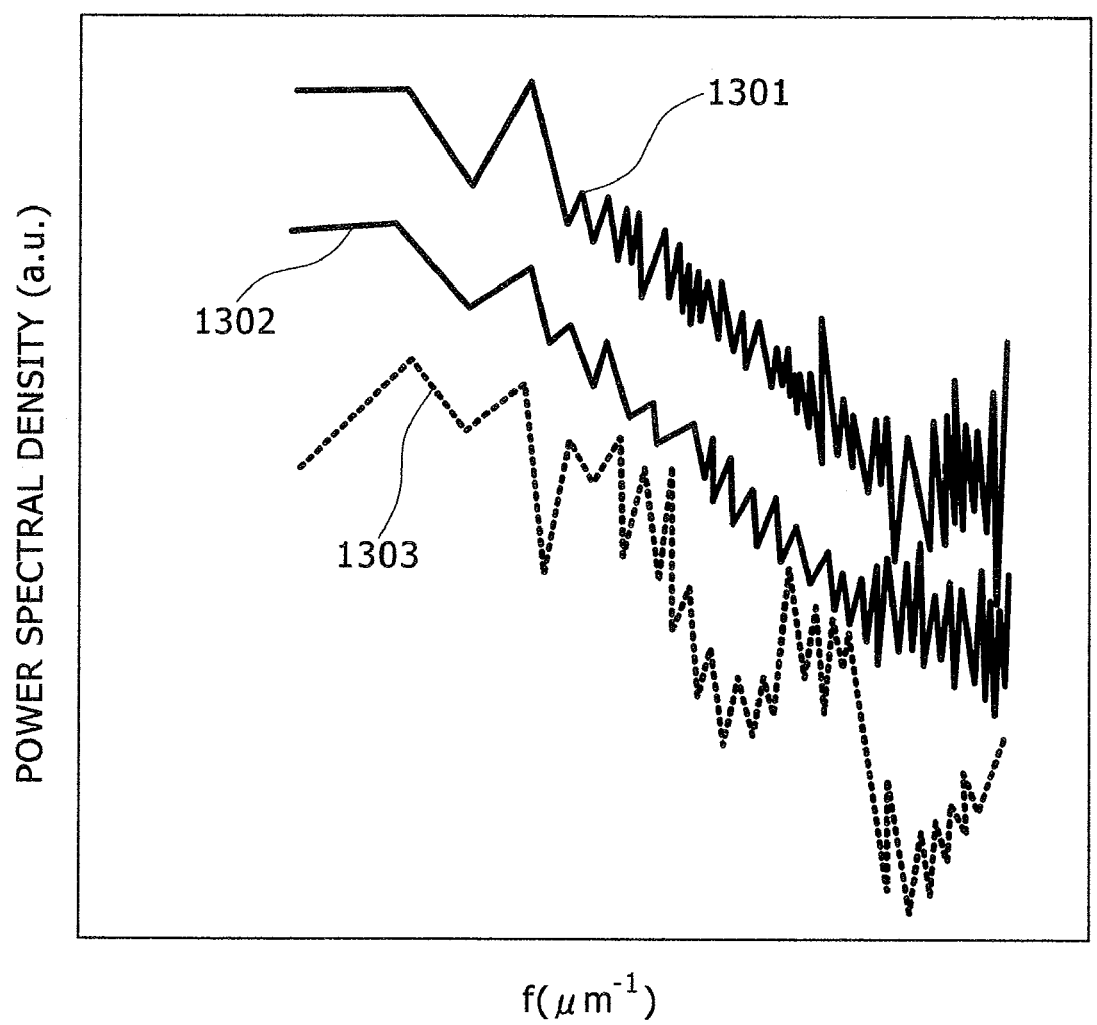
FIG. 13 is a diagram showing the spectrum of the LER obtained from the observation results with the CD-SEM according to the fourth embodiment.
Figure 14:
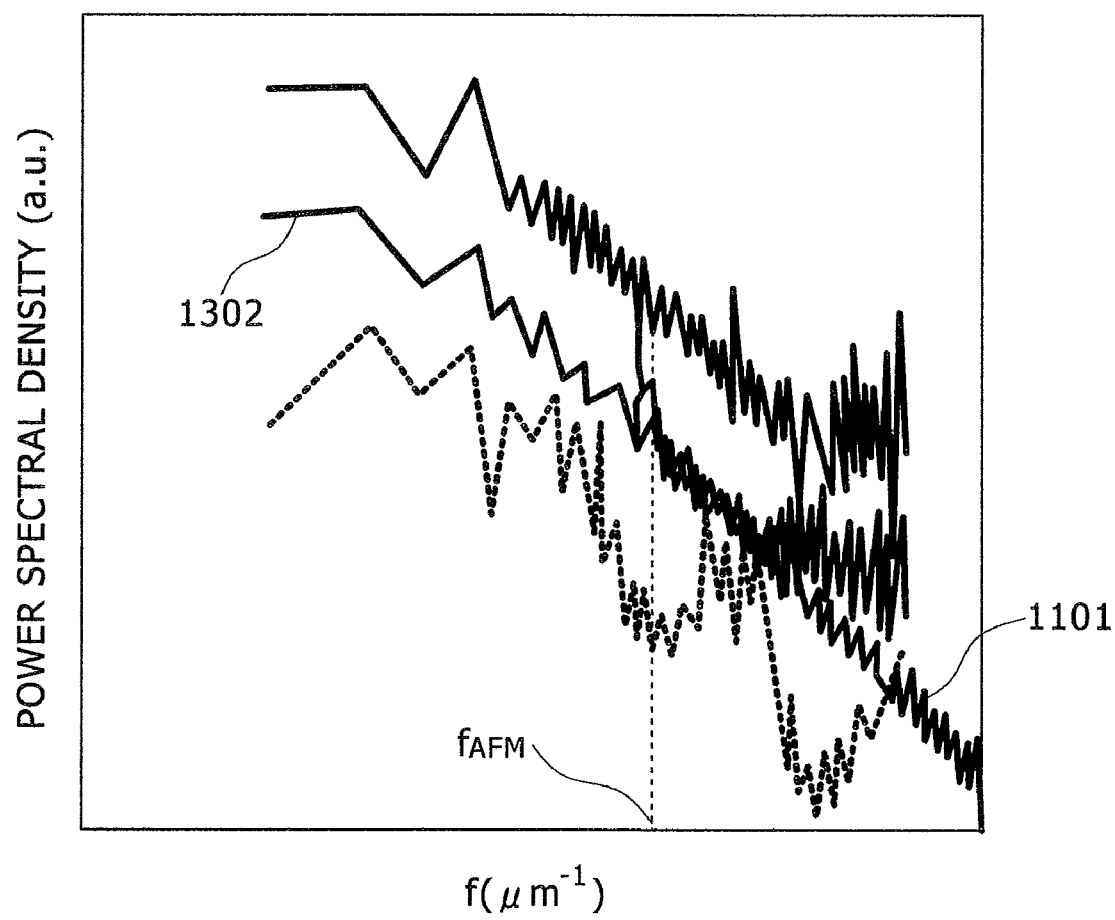
FIG. 14 is a diagram showing the spectrums of the LER obtained from the observation results with the CD-SEM and the observation results with the AFM used in the fourth embodiment.
Figure 15:
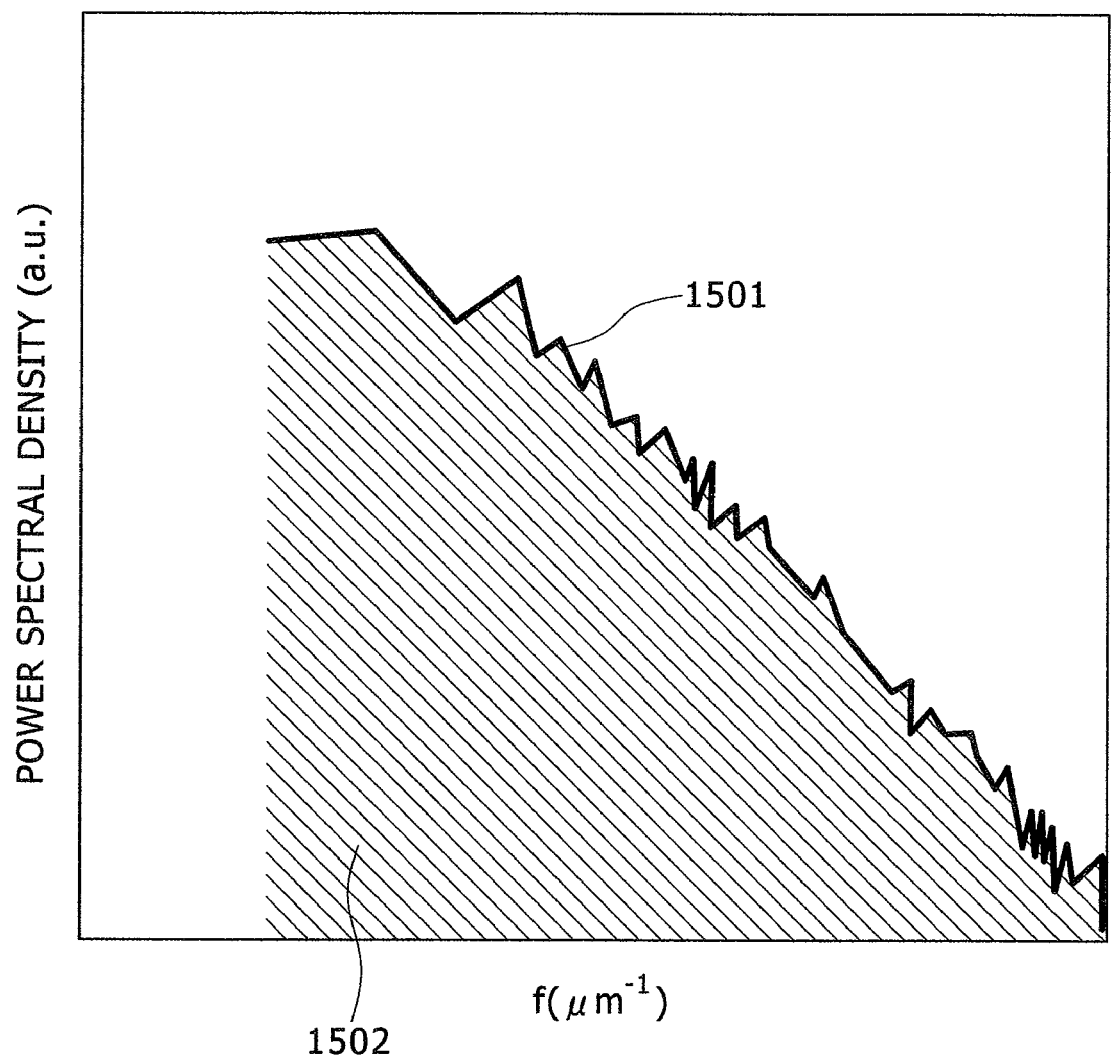
FIG. 15 is a diagram showing a spectrum that merges the spectrum of the LER obtained from the observation results with the CD-SEM and the observation results with the AFM obtained in the fourth embodiment.

A fourth embodiment will be described with reference to FIGS. 11, 12, 13, 14, and 15. In the fourth embodiment, a case will be described where the spectrum capable of indicating the entire characteristic of the roughness of the LER is used and the edge-extraction conditions that correspond to the edge point extraction of the position of 30% of the height of the pattern from the AFM data is obtained from the CD-SEM image. Further, FIG. 11 shows the Fourier spectrum of the LER obtained from the AFM observation results, FIG. 12 is a diagram for explaining a method of extracting the edge points from a signal profile by the straight line approximation method, FIG. 13 shows the Fourier spectrum of the LER obtained form the CD-SEM observation results, FIG. 14 shows the Fourier spectrum of LER obtained from both the CD-SEM observation results and the AFM observation results, and FIG. 15 shows the spectrum when the Fourier spectrum obtained from both the CD-SEM observation results and the Fourier spectrum obtained from the AFM observation results are merged.

h, which specifies the position of the point on the pattern surface obtained from the AFM observation results is the same as the first embodiment, is a value dividing the distance between the substrate and the points by the height of the pattern (in the area to be inspected). Further, when extracting the edge from the CD-SEM, the threshold method represented by Equation 4 used in the first embodiment and the straight line approximation method described below are used.

The system used and the sample observed are the same as those described in the first embodiment. The pattern observation is performed using the AFM and the CD-SEM according to the same sequence as the first embodiment to obtain the AFM data and the CD-SEM image as described below.

First, the edge point of the left edge of the position of h=0.3 is extracted from the AFM data of the area of 500 nm along the edge and the set of the coordinates of the points is obtained. Since a direction along the edge is the y coordinate, the set of the points can be represented by $\{x_{Li}, i\Delta y | i=1, 2, \ldots n\}$.

Herein, Δy is the extraction interval of the edge point and is 0.5 nm. Further, n=1001. FIG. 11 shows one that the numerical sequence of the x coordinate is subjected to Fourier transform and the power spectral density is plotted. Hereinafter, the spectrum obtained by the above description is described as the spectrum of the LER. In the graph, since a transverse axis is the spatial frequency and a longitudinal axis is the power spectral density, the transverse axis and the longitudinal axis are indicated as the logarithm plot. The LER spectrum 1101 of the AFM data is approximately inversely proportional to a square of f. Further, the straight line 1102 shows the straight line (the graph is generally a curved line, but the logarithm plot is a straight line) that is inverse proportion to a square of f.

Next, the edge point of the left edge is extracted from the CD-SEM image by the threshold method under the conditions of t=0.3 and 0.7. At this time, the y coordinate of the signal profile that outputs the edge point is also provided by Equation 1, but Δy is 2 nm and n is 1001. Moreover, the definition of t is the same as the second embodiment and is represented by Equation 4. The area where the edge is extracted has a length of 2 microns along the edge and includes a portion measured with the AFM. In addition, the edge point is also obtained by using the threshold method as well as the straight line approximation method. This is a method that provides the edge point as shown in FIG. 12. First, a tangent line 1202 is extracted at a place where a gradient of the signal profile 1201 is the greatest size. The straight line 1203 is extracted by approximating a bottom portion of the signal. An intersecting point of the tangent line 1202 and the straight line 1203 is defined as the edge point.

Next, the Fourier spectrum of the LER is calculated from the set of the edge points obtained by the above-mentioned method. This is shown in FIG. 13. The transverse axis and the longitudinal axis of the graph are the same as FIG. 11. A spectrum 1301 is a spectrum obtained from the edge point that is extracted using t=0.3 by the threshold method, a spectrum 1302 is a spectrum obtained from the edge point that is extracted using the approximation straight line method, and a spectrum 1303 is a spectrum obtained from the edge point that is extracted using t=0.7 in the threshold method. If these spectrums are overlapped with the spectrum of FIG. 11, as shown in FIG. 14, it can be appreciated that one well matching the spectrum 1101 obtained from the AFM is the spectrum obtained by the straight line approximation method of the spectrum 1302. The left edge of the spectrum 1101 does not match the spectrum 1302. However, it can be considered that this is because the measurement of the low frequency domain with the AFM is inaccurate as compared to the CD-SEM. Thereby, it can be appreciated that h=0.3 corresponds to the straight line approximation method.

Further, if the spectrums 1101 and 1302 are compared, it can be appreciated that the area where the reliability of the AFM data is high is an area where the frequency is $f_{AFM}$ or more (FIG. 14). Meanwhile, the AFM, which does not include noise in the high frequency domain, is high in terms of reliability. The spectrum 1101 and the spectrum 1302 are connected. As a result, FIG. 15 is obtained. Of the spectrum 1501, the portion where the frequency is $f_{AFM}$ or less is the same as the spectrum 1302 and the portion where the frequency is $f_{AFM}$ or more is the same as the spectrum 1101. Thereby, it is possible to accurately obtain the LER spectrum in the wide spatial frequency domain band and the analysis on the defect such as the analysis on the cause of the LER is accurately performed as compared to the related art. As a result, time required to measure the defect is about 60% of the related art. Further, it is possible to obtain $σ^2$ by integrating the spectrum 1501 obtained by the above-mentioned method. This is the same as one obtaining an area of a shaded portion 1502 of FIG. 15. Further, σ is σ included in 3σ that is a general index indicating the size of the LER. Therefore, the LER index is obtained by calculating three times a square root of an integration value.

Thereafter, in the measurement of LER, CD, and LWR, these index values corresponding to h=0.7 can be simply measured at a high speed by using the straight line approximation method, the precision and speed of the measurement of the pattern shape are improved, and the yield of the semiconductor device created using the pattern is improved.

Fifth Embodiment

Figure 16:
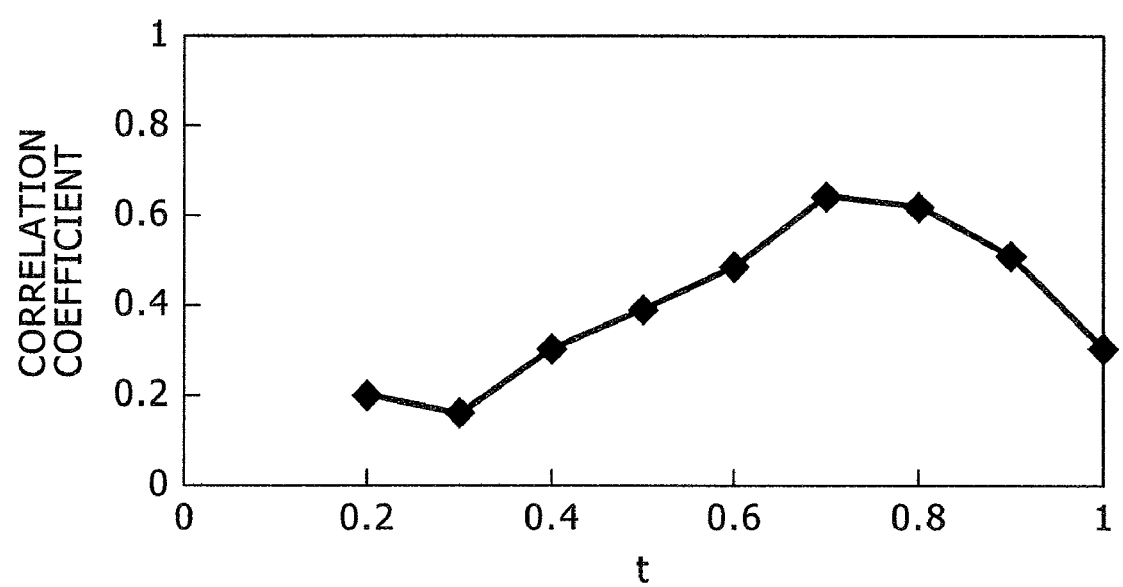
FIG. 16 is a graph diagram showing a plot of the correlation coefficient between the LER obtained from the observation results with the AFM and the LER obtained according to a threshold method from the observation results with the CD-SEM according to the fifth embodiment with respect to a threshold level of the threshold method.

A fifth embodiment of the present invention will be described with reference to FIG. 16. In the fifth embodiment, a case where the roughness of the LER itself, that is, the set of the edge points is used and the edge-extraction conditions that correspond to the edge-extraction of the position of 50% of the height of the pattern from the AFM observation results are obtained from the CD-SEM image will be described. Further, FIG. 16 is a graph that plots the correlation coefficient between the LER obtained from the AFM observation results and the LER obtained by the threshold method from the CD-SEM observation results with respect to the threshold level of the threshold method.

h, which specifies the position of the point on the pattern surface obtained from the AFM data is the same as the first embodiment, is a value dividing the distance between the substrate and the points by the height of the pattern (in the area to be inspected). Further, when extracting the edge from the CD-SEM, the threshold method represented by Equation 4 is used.

The system used and the sample observed are the same as ones described in the first embodiment. The pattern observation is performed using the AFM and the CD-SEM according to the same sequence as the first embodiment to obtain the AFM data and the CD-SEM image as described below.

First, the edge point of the left edge of the position of h=0.5 is extracted from the AFM data of the area of 500 nm along the edge and the set of the coordinates of the points is obtained. Since a direction along the edge is the y coordinate, the set of the points can be represented by $\{x_{Li}, i\Delta y | i=1, 2, \ldots n\}$. Herein, $\Delta y$ is the extraction interval of the edge point and is 0.5 nm. Further, n=1001. The straight line (approximation straight line) that describes in more detail the set of these points is obtained, the difference between the edge point and the x coordinate of the approximation straight line is obtained on each straight line represented by Equation 1, the difference is assumed to be $\Delta x_{Li}$ and this is also marked by $\Delta x\_AFM(y)$ from a function of the y coordinate and the data obtained from the AFM observation results. Herein, y satisfies Equation 1.

Next, the edge points are obtained from the CD-SEM observation image by using the threshold method. The edge-extraction conditions are t=0.2, 0.3, 0.4, 0.5, 0.6, 0.7, 0.8, 0.9, and 1.0. The same place as the place observed with the AFM is observed with the CD-SEM and the set of the edge points from the same spot as one analyzed with the AFM under the above-mentioned conditions, which is 500 nm along the edge, is obtained. The extraction interval of the edge point is the same. Further, in each condition, $\Delta x_{Li}$ is obtained by the same sequence as the case of the AFM data such as obtaining the straight line that describes in more detail the set of the edge points. Since this is a function of the y coordinate and one obtained by using the values of t from the CD-SEM observation results, this is marked by $\Delta x\_SEM(t;y)$.

Next, the correlation coefficient between $\Delta x\_AFM(y)$ and $\Delta x\_SEM(t;y)$ is calculated. This becomes a function of t. This is shown in FIG. 16. From these results, it can be appreciated that the roughness of the edge extracted at h=0.5 from the AFM at this time most approximates the roughness of the edge extracted from the CD-SEM image at t=0.7. And, it can be concluded that this corresponds to t=0.7 at h=0.5.

Thereafter, in the evaluation of LER, CD, and LWR, etc., these index values corresponding to h=0.5 can be simply measured at a high speed by using t=0.7, the precision and speed of the measurement of the pattern shape are improved, and the yield of the semiconductor device created using the pattern is improved.

The apparatus for data analysis for the scanning electron microscope of the present invention as described above calculates the dimension of the pattern or the roughness of the edge that is calculated from the pattern image in the inspection process at the time of manufacturing the semiconductor, and values more approximating to true values can be simply obtained in a short time. Thereby, the shape index directly associated with the performance of the manufactured semiconductor device is accurately obtained in a short time and the yield is improved.

What is claimed is:

1. An apparatus for data analysis comprising; a processor and a display unit, wherein the processor obtains first roughness parameters indicating characteristics of roughness of edges of a line pattern from cross section data cut in a plane parallel with a substrate based on results obtained by observing a line pattern on the substrate by a scanning probe microscope; displays a first graph using values of the first roughness parameters as one value and values indicating a distance from the substrate of the plane as another value on the display unit; obtains second roughness parameters of the edges of the line pattern extracted according to image processing conditions from an observation image of the line pattern from an upper surface of the substrate by a scanning electron microscope and displays a second graph using values of the second roughness parameters as one value and values indicating the image processing conditions as another value on the display unit, and wherein the processor obtains the image processing conditions for extracting the edge points of the line pattern in the values indicating the distance from the observation image of the scanning electron microscope by obtaining the image processing conditions where the values of the second roughness parameters are equal to the values of the first roughness parameters.

2. The apparatus for data analysis according to claim 1, wherein in the case where an x coordinate is defined in a direction vertical to a line of the line pattern as the first and second roughness parameters, values that indicate a standard deviation of distribution of an x coordinate of the edge points of the line pattern or skewness γ of a distribution of the x coordinate of the edge point of the line pattern or a y coordinate vertical to the x coordinate is defined, an auto-correlation length ξ of Δx(y) is used where a deviation from an average value or a design value of the x coordinate of the edge point of the line pattern is represented as a function of y.

3. The apparatus for data analysis according to claim 1, wherein the processor obtains Q1 that is a characteristic point of a shape of the graph in the first graph, obtains Q2 that is a characteristic point of the shape of the graph in the second graph, and obtains the image processing conditions for extracting the edge points of the line pattern in the values indicating the distance based on correspondence relations between the point Q1 and the point Q2.

4. The apparatus for data analysis according to claim 1, wherein the processor obtains the image processing conditions for extracting the edge points of the line pattern in the values indicating the distance from the observation image of the scanning electron microscope by observing a pattern whose height formed on the substrate is previously known.

5. The apparatus for data analysis according to claim 1, wherein the processor has a function that performs inspection of the edge point by the image processing conditions in measuring using the scanning electron microscope after obtaining the image processing conditions for extracting the edge points of the line pattern in the values indicating the distance.

6. The apparatus for data analysis according to claim 1,
wherein the processor includes a function that records, as a pair of data, information of the line pattern observed by the scanning electron microscope, the values indicating the distance, and the image processing conditions of the observation results of the scanning electron microscope corresponding to the values indicating the distance in a recording medium; and
a function that outputs the corresponding image processing conditions when the information on the observed line pattern and the values indicating the distance of the edge points of the extracted line pattern by the operator are input.

7. A method for data analysis comprising:
obtaining first roughness parameters indicating characteristics of roughness of edges of a line pattern from cross section data cut in a plane parallel with a substrate based on results obtained by observing a line pattern on the substrate by a scanning probe microscope;
displaying a first graph using values of the first roughness parameters as one value and values indicating a distance from the substrate of the plane as another value on a display unit;
obtaining second roughness parameters of the edges of the line pattern extracted according to image processing conditions from an observation image of the line pattern from an upper surface of the substrate by a scanning electron microscope; and
displaying a second graph using values of the second roughness parameters as one value and values indicating the image processing conditions as another value on the display unit,
wherein the image processing conditions are determined for extracting the edge points of the line pattern in the values indicating the distance from the observation image of the scanning electron microscope by obtaining the image processing conditions where the values of the second roughness parameters are equal to the values of the first roughness parameters.

8. The method for data analysis according to claim 7, wherein in the case where an x coordinate is defined in a direction vertical to a line of the line pattern as the first and second roughness parameters, values that indicate a standard deviation of distribution of an x coordinate of the edge points of the line pattern or skewness γ of a distribution of the x coordinate of the edge point of the line pattern or a y coordinate vertical to the x coordinate is defined, an auto-correlation length ξ of Δx(y) is used where a deviation from an average value or a design value of the x coordinate of the edge point of the line pattern is represented as a function of y.

9. The method for data analysis according to claim 7, wherein a value Q1 is obtained that is a characteristic point of a shape of the graph in the first graph, a value Q2 is obtained that is a characteristic point of the shape of the graph in the second graph, and the image processing conditions for extracting the edge points of the line pattern in the values indicating the distance are obtained based on correspondence relations between the point Q1 and the point Q2.

10. The method for data analysis according to claim 7, wherein the image processing conditions for extracting the edge points of the line pattern in the values indicating the distance from the observation image of the scanning electron microscope are obtained by observing a pattern whose height formed on the substrate is previously known.

11. The method for data analysis according to claim 7, wherein inspection is performed on the edge point by the image processing conditions using the scanning electron microscope after obtaining the image processing conditions for extracting the edge points of the line pattern in the values indicating the distance.

12. The method for data analysis according to claim 7, further comprising
recording, as a pair of data, information of the line pattern observed by the scanning electron microscope, the values indicating the distance, and the image processing conditions of the observation results of the scanning electron microscope corresponding to the values indicating the distance in a recording medium; and
outputting the corresponding image processing conditions when the information on the observed line pattern and the values indicating the distance of the edge points of the extracted line pattern by the operator are input.

* * * * *